US009102792B2

(12) United States Patent
Nair et al.

(10) Patent No.: US 9,102,792 B2
(45) Date of Patent: Aug. 11, 2015

(54) HIGH PERFORMANCE POLYMER COMPOSITION WITH IMPROVED FLOW PROPERTIES

(71) Applicant: Ticona LLC, Florence, KY (US)

(72) Inventors: Kamlesh P. Nair, Florence, KY (US); Joseph J. Grenci, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/183,834

(22) Filed: Feb. 19, 2014

(65) Prior Publication Data

US 2014/0243485 A1 Aug. 28, 2014

Related U.S. Application Data

(60) Provisional application No. 61/767,929, filed on Feb. 22, 2013.

(51) Int. Cl.
| | |
|---|---|
| *C08G 65/48* | (2006.01) |
| *C08L 71/10* | (2006.01) |
| *C08J 5/10* | (2006.01) |
| *C09K 19/22* | (2006.01) |
| *C08K 5/20* | (2006.01) |
| *C09J 5/10* | (2006.01) |
| *C08L 71/00* | (2006.01) |
| *C09K 19/30* | (2006.01) |
| *C09K 19/32* | (2006.01) |
| *C09K 19/34* | (2006.01) |
| *C09K 19/38* | (2006.01) |
| *C09K 19/54* | (2006.01) |

(Continued)

(52) U.S. Cl.
CPC ............... *C08G 65/48* (2013.01); *C08G 69/12* (2013.01); *C08J 5/10* (2013.01); *C08K 5/20* (2013.01); *C08L 71/00* (2013.01); *C08L 71/10* (2013.01); *C08L 79/08* (2013.01); *C09J 5/10* (2013.01); *C09K 19/22* (2013.01); *C09K 19/3086* (2013.01); *C09K 19/322* (2013.01); *C09K 19/3444* (2013.01); *C09K 19/3475* (2013.01); *C09K 19/3809* (2013.01); *C09K 19/54* (2013.01); *C08G 73/1053* (2013.01); *C08L 77/10* (2013.01); *C09K 2019/0481* (2013.01)

(58) Field of Classification Search
None
See application file for complete search history.

(56) References Cited

U.S. PATENT DOCUMENTS

| 4,038,416 A | 7/1977 | Mori et al. |
| 4,511,709 A | 4/1985 | Yoon et al. |

(Continued)

FOREIGN PATENT DOCUMENTS

| EP | 0071968 B1 | 2/1986 |
| EP | 0413375 A1 | 2/1991 |

(Continued)

OTHER PUBLICATIONS

Machine-generated English-language translation of JP-08157640, translation generated Nov. 2014, 15 pages.*

(Continued)

*Primary Examiner* — Robert S Loewe
(74) *Attorney, Agent, or Firm* — Dority & Manning, P.A.

(57) ABSTRACT

A polymer composition that contains at least one high performance polymer and at least one aromatic amide oligomer is provided. The oligomer can serve as a flow aid that lowers the overall viscosity of the polymer matrix under shear.

31 Claims, 4 Drawing Sheets

(51) Int. Cl.
*C08G 69/12* (2006.01)
*C08L 79/08* (2006.01)
*C09K 19/04* (2006.01)
*C08G 73/10* (2006.01)
*C08L 77/10* (2006.01)

(56) References Cited

U.S. PATENT DOCUMENTS

| | | | |
|---|---|---|---|
| 4,569,997 A * | 2/1986 | Karrer | 546/19 |
| 4,611,025 A | 9/1986 | Akkapeddi et al. | |
| 4,831,104 A | 5/1989 | Aya et al. | |
| 4,851,562 A | 7/1989 | de Jonge et al. | |
| 4,952,662 A | 8/1990 | Finke et al. | |
| 4,968,737 A | 11/1990 | Finke et al. | |
| 4,980,444 A | 12/1990 | de Jonge et al. | |
| 4,980,504 A | 12/1990 | De Jonge et al. | |
| 5,093,464 A | 3/1992 | Yoon et al. | |
| 5,102,935 A | 4/1992 | Heinz et al. | |
| 5,162,489 A | 11/1992 | De Jonge et al. | |
| 5,241,067 A * | 8/1993 | Myers | 544/130 |
| 5,258,470 A | 11/1993 | Poll et al. | |
| 5,352,746 A | 10/1994 | Asai et al. | |
| 5,446,124 A | 8/1995 | Niwano et al. | |
| 5,480,907 A | 1/1996 | Hayashi et al. | |
| 5,496,893 A | 3/1996 | Gagne et al. | |
| 5,500,294 A | 3/1996 | Sakumoto et al. | |
| 5,510,189 A | 4/1996 | Sakumoto et al. | |
| 5,541,267 A | 7/1996 | Akkapeddi et al. | |
| 5,573,752 A | 11/1996 | Ranganathan et al. | |
| 5,609,956 A | 3/1997 | Sakumoto et al. | |
| 5,614,316 A | 3/1997 | Hashimoto et al. | |
| 5,618,889 A | 4/1997 | Kumpf et al. | |
| 6,294,618 B1 | 9/2001 | Soelch | |
| 6,686,467 B2 | 2/2004 | Brown et al. | |
| 6,740,728 B2 | 5/2004 | Ding et al. | |
| 7,175,916 B2 * | 2/2007 | Ikuta et al. | 428/476.9 |
| 7,238,714 B2 | 7/2007 | Nakao et al. | |
| 7,368,526 B2 | 5/2008 | Yuan et al. | |
| 7,405,250 B2 | 7/2008 | Kim | |
| 7,423,088 B2 * | 9/2008 | Mader et al. | 525/193 |
| 7,534,914 B2 | 5/2009 | Koike et al. | |
| 7,608,648 B2 | 10/2009 | Meakin et al. | |
| 7,754,717 B2 | 7/2010 | Dimauro et al. | |
| 7,759,344 B2 | 7/2010 | Booker et al. | |
| 7,790,793 B2 * | 9/2010 | Schmidt et al. | 524/228 |
| 7,825,176 B2 | 11/2010 | Kim et al. | |
| 7,837,896 B2 | 11/2010 | Flath et al. | |
| 7,875,234 B2 | 1/2011 | Richter et al. | |
| 7,906,574 B2 | 3/2011 | Meakin et al. | |
| 8,017,691 B2 | 9/2011 | Richter et al. | |
| 8,084,476 B2 | 12/2011 | Koike et al. | |
| 8,084,637 B2 | 12/2011 | Chopra et al. | |
| 8,309,734 B2 | 11/2012 | Bissantz et al. | |
| 8,440,313 B2 | 5/2013 | Cho et al. | |
| 8,637,583 B2 | 1/2014 | Hermanutz et al. | |
| 8,669,341 B2 | 3/2014 | Nair et al. | |
| 8,722,723 B2 | 5/2014 | Fujimaki et al. | |
| 8,754,162 B2 | 6/2014 | Maljkovic et al. | |
| 8,778,221 B2 | 7/2014 | Nair et al. | |
| 8,796,392 B2 * | 8/2014 | Luo et al. | 525/420 |
| 8,813,332 B2 | 8/2014 | Leibfried et al. | |
| 8,852,730 B2 | 10/2014 | Nair et al. | |
| 8,865,281 B2 | 10/2014 | Axelrad et al. | |
| 8,906,258 B2 | 12/2014 | Gray et al. | |
| 8,945,694 B2 | 2/2015 | Aneja et al. | |
| 2003/0181560 A1 * | 9/2003 | Kawaguchi et al. | 524/424 |
| 2005/0100724 A1 | 5/2005 | Seargeant | |
| 2007/0066765 A1 | 3/2007 | Aneja et al. | |
| 2007/0185118 A1 | 8/2007 | Hooft Van Huijsduijnen et al. | |
| 2007/0219324 A1 | 9/2007 | Aneja et al. | |
| 2007/0232594 A1 | 10/2007 | Yokoyama et al. | |
| 2008/0312387 A1 | 12/2008 | El-Hibri et al. | |
| 2009/0048379 A1 | 2/2009 | Weinberg et al. | |
| 2009/0092827 A1 | 4/2009 | Robinson | |
| 2009/0111950 A1 * | 4/2009 | Yamazaki et al. | 525/420 |
| 2009/0306309 A1 * | 12/2009 | Ishio et al. | 525/519 |
| 2010/0024695 A1 | 2/2010 | Difrancia et al. | |
| 2010/0130743 A1 | 5/2010 | Wada et al. | |
| 2011/0003163 A1 | 1/2011 | Wood | |
| 2011/0060079 A1 * | 3/2011 | Kim et al. | 524/99 |
| 2011/0152162 A1 * | 6/2011 | Schneiderman et al. | 510/340 |
| 2011/0184188 A1 | 7/2011 | Wada et al. | |
| 2012/0160829 A1 | 6/2012 | Dufaure et al. | |
| 2012/0270022 A1 | 10/2012 | Alting et al. | |
| 2013/0025734 A1 | 1/2013 | Kuhmann et al. | |
| 2013/0032240 A1 | 2/2013 | Kuhmann et al. | |
| 2013/0048909 A1 | 2/2013 | Nair et al. | |
| 2013/0048910 A1 | 2/2013 | Nair et al. | |
| 2013/0048914 A1 | 2/2013 | Nair et al. | |
| 2013/0052446 A1 * | 2/2013 | Nair et al. | 428/220 |
| 2013/0052447 A1 | 2/2013 | Grenci et al. | |
| 2013/0053531 A1 | 2/2013 | Nair et al. | |
| 2013/0053532 A1 | 2/2013 | Nair et al. | |
| 2013/0056108 A1 | 3/2013 | Wood et al. | |
| 2013/0062558 A1 | 3/2013 | Nair et al. | |
| 2013/0155597 A1 | 6/2013 | Luo et al. | |
| 2013/0157033 A1 | 6/2013 | Luo et al. | |
| 2014/0004328 A1 | 1/2014 | Kim et al. | |
| 2014/0242385 A1 | 8/2014 | Nair et al. | |
| 2014/0288221 A1 | 9/2014 | Nair et al. | |
| 2014/0350156 A1 | 11/2014 | Luo et al. | |

FOREIGN PATENT DOCUMENTS

| | | | | |
|---|---|---|---|---|
| EP | 0852249 | A1 | 7/1998 | |
| EP | 1095930 | B1 | 5/2001 | |
| EP | 1792942 | A1 | 6/2007 | |
| GB | 2425495 | A | 1/2006 | |
| GB | 2488212 | A | 8/2012 | |
| JP | 08157640 | A * | 6/1996 | C08K 5/20 |
| WO | WO 9822103 | | 5/1998 | |
| WO | WO 2013032967 | A1 | 3/2013 | |
| WO | WO 2013032970 | A1 | 3/2013 | |
| WO | WO 2013032971 | A1 | 3/2013 | |
| WO | WO 2013032978 | A1 | 3/2013 | |
| WO | WO 2013032981 | A1 | 3/2013 | |

OTHER PUBLICATIONS

Abstract of Chinese Patent—CN101157268, Apr. 9, 2008, 1 page.
Abstract of Chinese Patent—CN101215404, Jul. 9, 2008, 1 page.
Abstract of Chinese Patent—CN101225555, Jul. 23, 2008, 1 page.
Abstract of Chinese Patent—CN101302335, Nov. 12, 2008, 1 page.
Abstract of Chinese Patent—CN101367994, Feb. 18, 2009, 1 page.
Abstract of Chinese Patent—CN101387017, Mar. 18, 2009, 1 page.
Abstract of Chinese Patent—CN101475729, Jul. 8, 2009, 1 page.
Abstract of Chinese Patent—CN101831177, Sep. 15, 2010, 1 page.
Abstract of Chinese Patent—CN102250446, Nov. 23, 2011, 1 page.
Abstract of Chinese Patent—CN102321338, Jan. 18, 2012, 1 page.
Abstract of Chinese Patent—CN102337019, Feb. 1, 2012, 1 page.
Abstract of Chinese Patent—CN102344662, Feb. 8, 2012, 2 paqes.
Abstract of Chinese Patent—CN102407079, Apr. 11, 2012, 1 page.
Abstract of Chinese Patent—CN102775726, Nov. 14, 2012, 1 page.
Abstract of Chinese Patent—CN102827455, Dec. 19, 2012, 1 page.
Abstract of Chinese Patent—CN102898808, Jan. 30, 2013, 1 page.
Abstract of Chinese Patent—CN102942780, Feb. 27, 2013, 1 page.
Abstract of European Patent—EP0523326, Jan. 20,1993, 1 page.
Abstract of German Patent—DE2041773, 1972, 1 page.
Abstract of German Patent—DE4017685, Dec. 5,1991, 1 page.
Abstract of Japanese Patent—JP2001234053A,'Aug. 28, 2001, 2 pages.
Abstract of Japanese Patent—JP2002284980A. Oct. 3, 2002, 1 page.
Abstract of Japanese Patent—JP2004182748A, Jul. 2, 2004, 1 page.
Abstract of Japanese Patent—JP2005248052A, Sep. 15, 2005, 1 page.
Abstract of Japanese Patent—JP2005298772A, Oct. 27, 2005, 1 page.
Abstract of Japanese Patent—JP2006225644, Aug. 31, 2006, 1 page.
Abstract of Japanese Patent—JP2006257047, Sep. 28, 2006, 1 page.
Abstract of Japanese Patent—JP2007238851A, Sep. 20, 2007, 1 page.

(56) References Cited

OTHER PUBLICATIONS

Abstract of Japanese Patent—JP2009108179A, May 21, 2009, 1 page.
Abstract of Japanese Patent—JP2009108180A, May 21, 2009, 1 page.
Abstract of Japanese Patent—JP2010095613A, Apr. 30, 2010, 1 page.
Abstract of Japanese Patent—JP2010174114A, Aug. 12, 2010, 1 page.
Abstract of Japanese Patent—JPH01115926, May 9 1989, 1 page.
Abstract of Jananese Patent—JPH02151626, Jun. 11, 1990, 1 page.
Abstract of Japanese Patent—JPH02240134, Sep. 25, 1990, 1 page.
Abstract of Japanese Patent—JPH02240138, Sep. 25, 1990, 1 page.
Abstract of Japanese Patent—JPH03072559, Mar. 27, 1991, 1 page.
Abstract of Japanese Patent—JPH03095260, Apr. 19, 1991, 2 pages.
Abstract of Japanese Patent—JPH06347770A, Dec. 22, 1994, 2 pages.
Abstract of Japanese Patent—JPH0673239, Mar. 15, 1994, 1 page.
Abstract of Japanase Patent—JPH09143347A, Jun. 3, 1997, 1 page.
Abstract of Japanese Patent—JPH09249813A, Sep. 22, 1997, 2 pages.
Abstract of Japanese Patent—JPH1160927A, Mar. 5, 1999, 2 pages.
Abstract of Japanese Patent—JPS58219233, Dec. 20, 1983, 2 pages.
Abstract of Japanese Patent—JPS5861145, Apr. 12, 1983, 1 page.
Abstract of Japanese Patent—JPS5861146, Apr. 12, 1983, 1 pages.
Abstract of Japanese Patent—JPS5883048, May 18, 1983. 2 pages.
Abstract of Jabanese Patent—JPS5893718, Jun. 3, 1983, 2 pages.
Abstract of Jabanese Patent—JPS59196364, Nov. 7, 1984, 1 page.
Abstract of Japanese Patent—JPS6049026, Mar. 18, 1984, 2 pages.
Abstract of Japanese Patent—JPS63137950, Jun. 9, 1988, 1 page.
Abstract of Japanese Patent—JPS63280730, Nov. 17, 1988, 2 pages.
Abstract of Japanese Patent—JPS63280731, Nov. 17, 1998 1 page.
Abstract of Japanese Patent—JPS63280732, Nov. 17, 1988 2 pages.
Abstract of Polish—PL92807, 1977, 1 page.
Abstract of Taiwanese Patent—TW397859B, Jul. 11, 2000, 1 page.
Abstract of International Patent—WO2013068686 A1, May 16, 2013, 1 page.
Abstract of Article—Ueda et al., "Diphenyl (2,3-Dihydro-2-thioxo-3-benzoxazolyl)phosphonate: A New, Reactive Activating Agent for the Synthesis of Amides and Polyamides," *Macromolecules*, vol. 21, No. 1, 1988, pp. 19-24.
Abstract of Article—Ueda et al., "Synthesis of Sequential Polyamide by Direct Polycondensation," *Polymer Journal*, vol. 23, No. 3, 1991, pp. 167-176.
Article—Gale et al., "Conformational Control of Selectivity and Stability in Hybrid Amide/Urea Macrocycles," *Chem. Eur. J.*, vol. 13, 2007, pp. 3320-3329.
Article—Han et al., "A Change in Mechanism from Acidolysis to Phenolysis in the Bulk Copolymerization of 4-Acetoxybenzoic Acid and 6-Acetoxy-2-naphthoic Acid," *Macromolecules*, 1996, vol. 29, No. 26, pp. 8313-8320.
Article—Kuz'min et al., "Kinetics of Acylation of Anilines Monosubstituted in the Ring by Benzoyl Chloride in N, N-Dimethylacetamide," *Zhurnal Organicheskoi Khimii*, vol. 17, No, 11, pp. 2394-2396, 1982.
Article—Shaul M. Aharoni, "Monodisperse Rodlike Oligomers and Their Mesomorphic Higher Molecular Weight Homologues," *Macromolecules*, vol. 20, No. 8, 1987, pp. 2010-2017.
Article—Washio et al., "Facile Synthesis of Polyamide Dendrimers from Unprotected AB$_2$ Building Blocks: Dumbbell-Shaped Dendrimer, Star-Shaped Dendrimer, and Dendrimer with a Carboxylic Acid at the Core," *Macromolecules*, vol. 38, No. 6, 2005, pp. 2237-2246.
International Search Report and Written Opinion for PCT/US2014/015485 dated Aug. 20, 2014, 10 pages.

\* cited by examiner

HIGH PERFORMANCE POLYMER COMPOSITION WITH IMPROVED FLOW PROPERTIES

RELATED APPLICATIONS

The present application claims priority to U.S. Provisional Application Ser. No. 61/767,929 (filed on Feb. 22, 2013) and which is incorporated herein in its entirety by reference thereto.

BACKGROUND OF THE INVENTION

High performance thermoplastic polymers, such as polyetherimide ("PEI") and polyetheretherketone ("PEEK"), have been used to fabricate parts for numerous engineering applications. Each application requires particular tensile and flexural properties, impact strength, heat distortion temperature, and resistance to warp. These thermoplastic polymers are characterized by a high glass transition temperature, typically above 100° C., which makes them suitable for use in applications that require exposure to high temperatures. One drawback to these materials, however, is that they exhibit poor melt flow properties, which makes processing difficult. As such, a need continues to exist for high performance polymers with excellent melt flow properties. Furthermore it would also be advantageous to enhance the thermo-mechanical properties of the molded articles, through such a process by either mechanically reinforcing it or by allowing for easier melt processing to get better parts resulting in enhanced thermo-mechanical properties of the final product.

SUMMARY OF THE INVENTION

In accordance with one embodiment, a polymer composition is disclosed that comprises a high performance polymer having a glass transition temperature of about 100° C. or more and an aromatic amide oligomer having the following general formula (I):

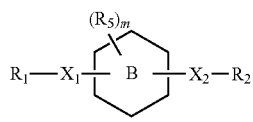

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION OF REPRESENTATIVE EMBODIMENTS

Definitions

Figure 1:
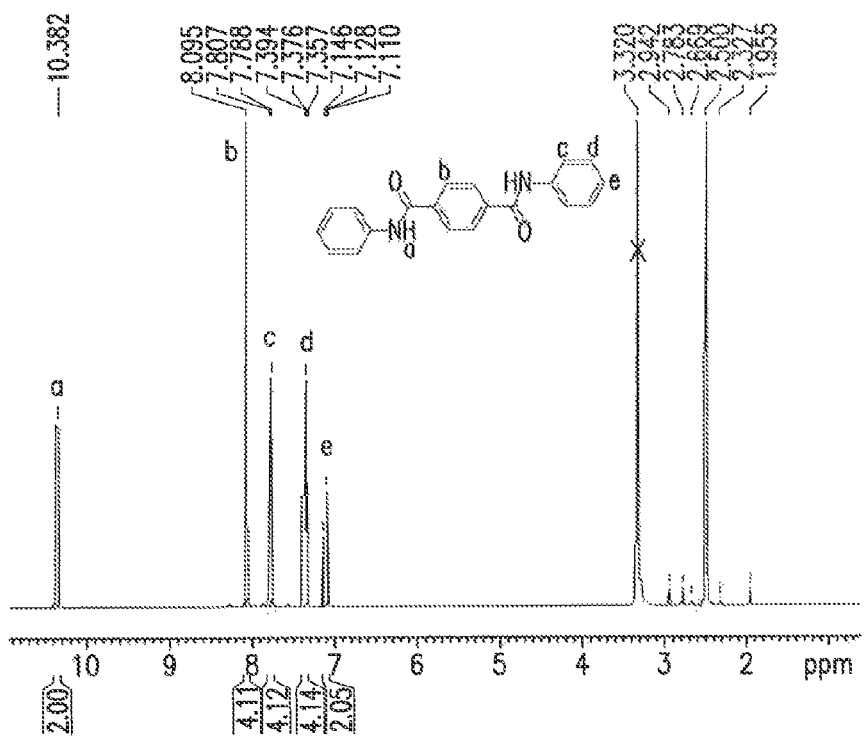
FIG. 1 is the Proton NMR characterization for N1,N4-diphenylterephthalamide (Compound A)
Figure 2:
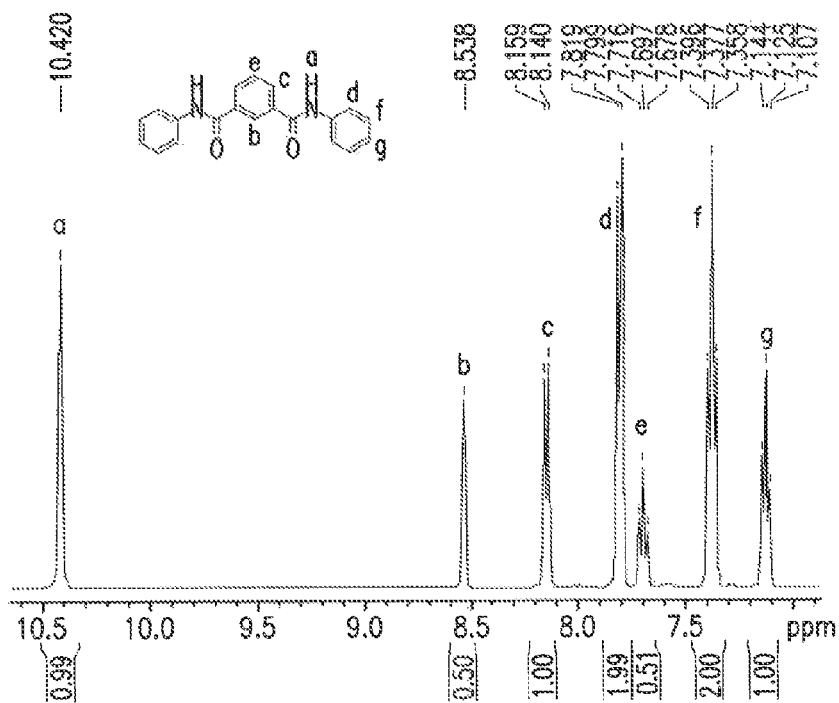
FIG. 2 is the Proton NMR characterization for N1,N4-diphenylisoterephthalamide (Compound B)
Figure 3:
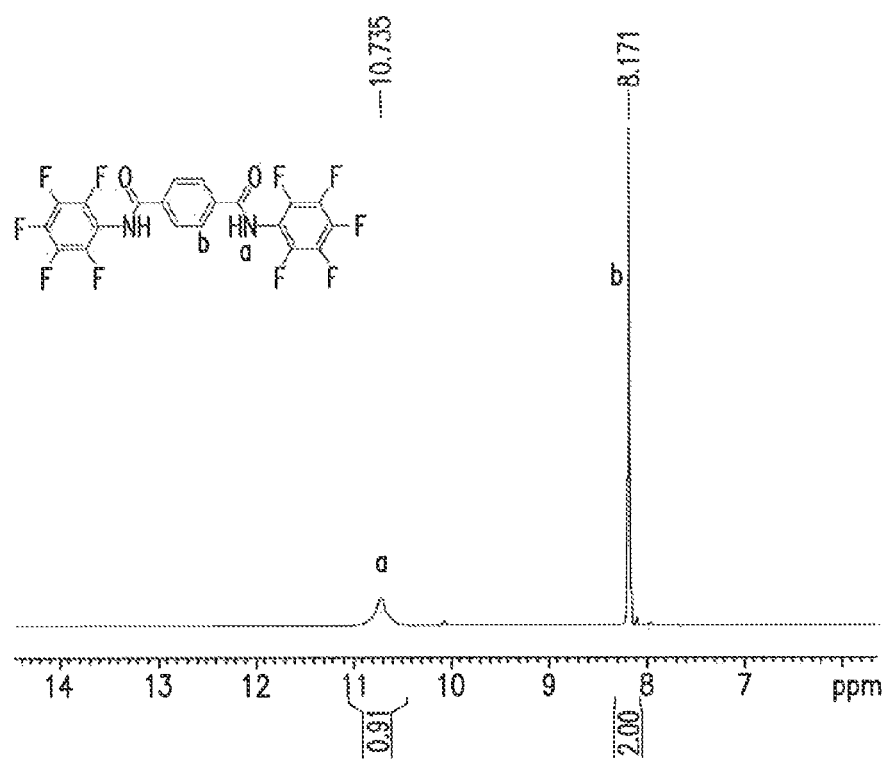
FIG. 3 is the Proton NMR characterization for N1,N4-bis (2,3,4,5,6-pentafluorophenyl)terephthalamide (Compound C)
Figure 4:
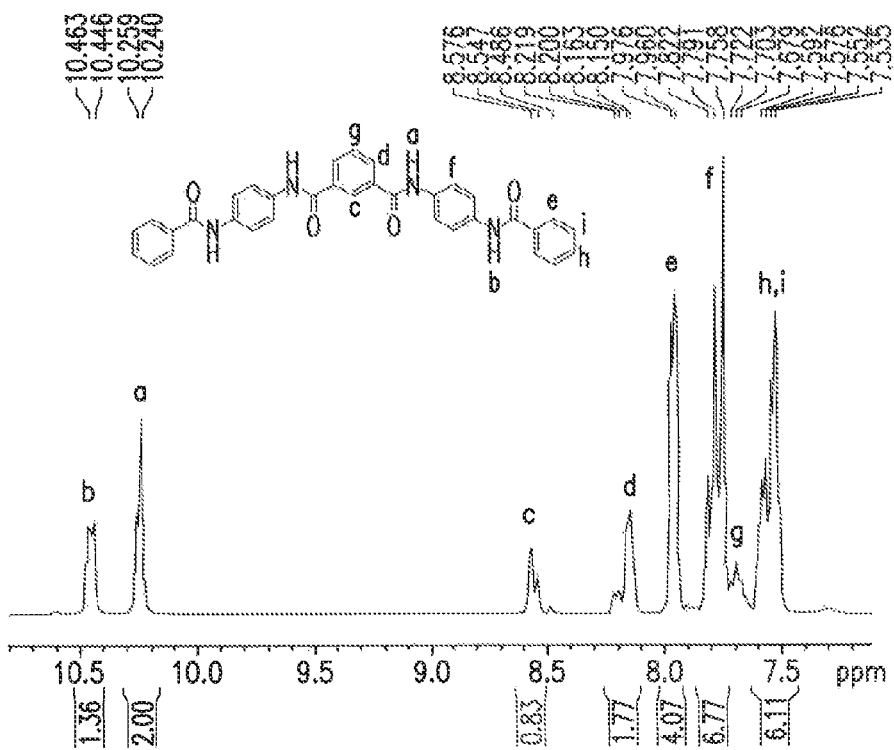
FIG. 4 is the Proton NMR characterization for N1,N3-bis (4-benzamidophenyl)benzene-1,3-dicarboxamide (Compound F2)
Figure 5:
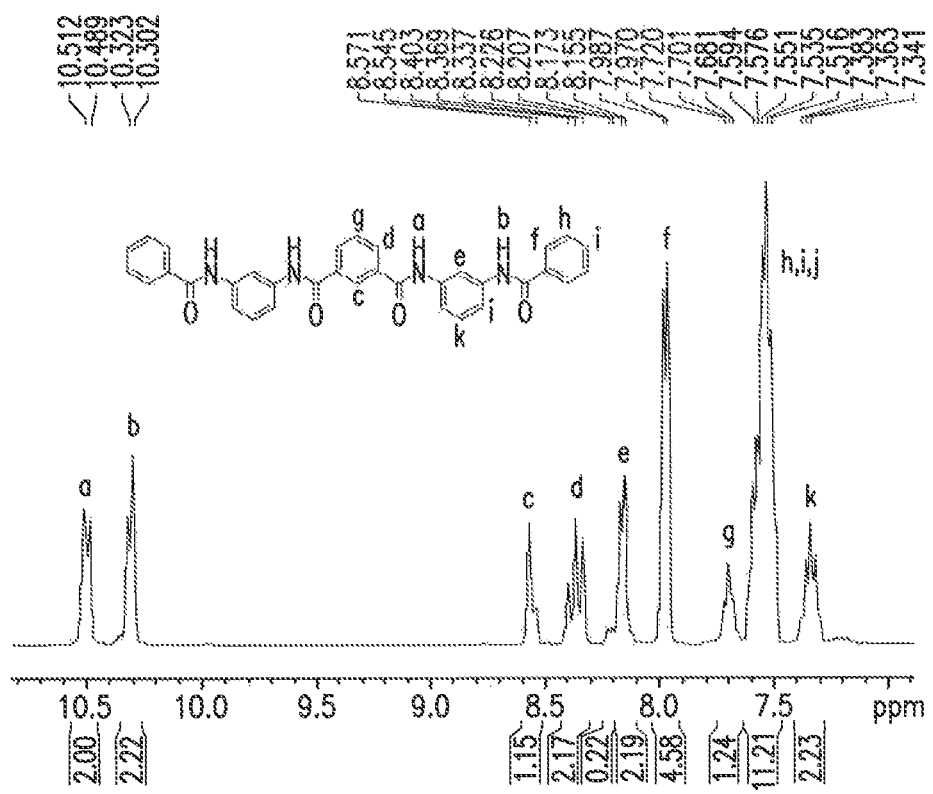
FIG. 5 is the Proton NMR characterization for N3-phenyl-N1-[3-[[3-(phenylcarbamoyl)benzoyl]amino]phenyl]benzene-1,3-dicarboxamide (Compound G2)

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocycloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that contains at least one high performance polymer (e.g., polyaryletherketone, polyetherimide, etc.) and at least one aromatic amide oligomer. Among other things, the oligomer can serve as a flow aid that lowers the overall viscosity of the polymer matrix under shear. The relative proportion of high performance polymer(s) and aromatic amide oligomer(s) in the composition may be selected to help achieve a balance between viscosity and mechanical properties. More particularly, high oligomer contents can result in low viscosity, but too high of a content may reduce the viscosity to such an extent that the oligomer adversely impacts the melt strength of the composition. In most embodiments, for example, aromatic amide oligomer(s) may be employed in an amount of from about 0.5 to about 50 parts, in some embodiments from about 1 to about 20 parts, and in some embodiments, from about 3 to about 15 parts by weight relative to 100 parts by weight of the high performance polymer(s). The aromatic amide oligomers may also constitute from about 0.1 wt. % to about 30 wt. %, in some embodiments from about 0.5 wt. % to about 20 wt. %, and in some embodiments, from about 1 wt. % to about 15 wt. % of the polymer composition. High performance polymers may likewise constitute from about 70 wt. % to about 99.9 wt. %, in some embodiments from about 80 wt. % to about 99.5 wt. %, and in some embodiments, from about 85 wt. % to about 99 wt. % of the polymer composition.

Various embodiments of the present invention will now be described in more detail.

I. Polymer Composition

A. Aromatic Amide Oligomer

The aromatic amide oligomer generally has a relatively low molecular weight. For example, the oligomer typically has a molecular weight of about 2,000 grams per mole or less, in some embodiments from about 50 to about 1,000 grams per mole, in some embodiments from about 100 to about 600 grams per mole, and in some embodiments, from about 150 to about 500 grams per mole. In addition to possessing a relatively low molecular weight, the oligomer also generally possesses a high amide functionality so it is capable of undergoing a sufficient degree of hydrogen bonding with the high performance polymer. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 1 to 10, in some embodiments from 2 to 8, and in some embodiments, from 2 to 4 amide functional groups per molecule. The amide equivalent weight may likewise be from about 10 to about 1,500 grams per mole or less, in some embodiments from about 50 to about 500 grams per mole, and in some embodiments, from about 100 to about 300 grams per mole.

In addition to simply reducing viscosity, the present inventors have also discovered that the oligomer is not easily volatized or decomposed during compounding, molding, and/or use. This minimizes off-gassing and the formation of blisters that would otherwise impact the final mechanical properties of a part made from the polymer composition. Without intending to be limited by theory, it is believed that active hydrogen atoms of the amide functional groups are capable of forming a hydrogen bond with the backbone of the high performance polymer. Such hydrogen bonding strengthens the attachment of the oligomer to the polymer matrix and thus minimizes the likelihood that it becomes volatilized during formation. While providing the benefits noted, the aromatic amide oligomer does not generally react with the polymer backbone to any appreciable extent so that the mechanical properties of the polymer are not adversely impacted. To help render it generally unreactive so that it does not form covalent bonds with the high performance polymer backbone, the oligomer typically contains a core formed from one or more aromatic rings (including heteroaromatic). The oligomer may also contain terminal groups formed from one or more aromatic rings and/or cycloalkyl groups. Such an "aromatic" oligomer thus possesses little, if any, reactivity with the base polymer. In one embodiment, for example, the aromatic amide oligomer may have the following general formula (I):

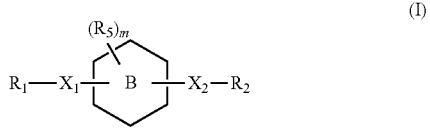

(I)

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

In certain embodiments, Ring B in Formula (I) above may be selected from the following:

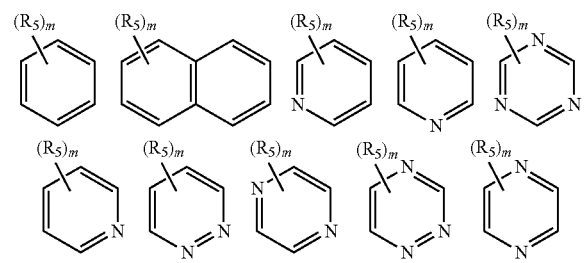

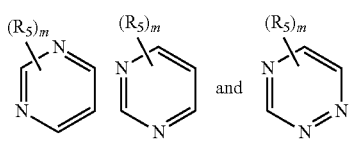

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. Ring B may be phenyl.

The oligomer may be a di-functional compound in that Ring B is directly bonded to only two (2) amide groups (e.g., C(O)HN or NHC(O)). In such embodiments, m in Formula (I) may be 0. Of course, in certain embodiments, Ring B may also be directly bonded to three (3) or more amide groups. For example, one embodiment of such a compound is provided by general formula (II):

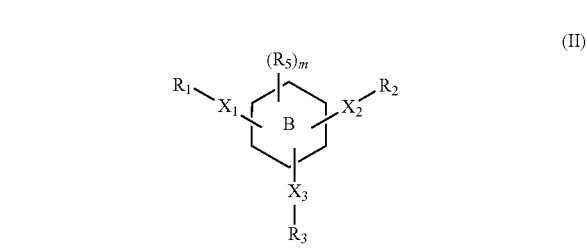

(II)

wherein, ring B, $R_5$, $X_1$, $X_2$, $R_1$, and $R_2$ are as defined above;

m is from 0 to 3;

$X_3$ is C(O)HN or NHC(O); and $R_3$ is selected from aryl, heteroaryl, cycloalkyl, and heterocyclyl.

Another embodiment of such a compound is provided by general formula (III):

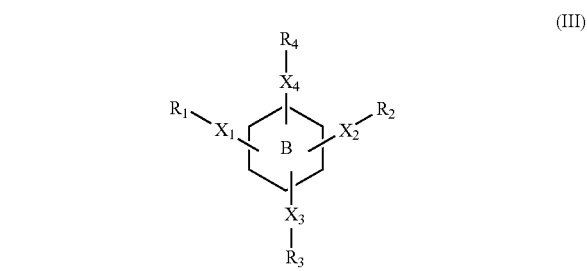

(III)

wherein, ring B, $R_5$, $X_1$, $X_2$, $X_3$, $R_1$, $R_2$, and $R_3$ are as defined above;

$X_4$ is C(O)HN or NHC(O); and $R_4$ is selected from aryl, heteroaryl, cycloalkyl, and heterocyclyl.

In some embodiments, $R_1$, $R_2$, $R_3$ and/or $R_4$ in the structures noted above may be selected from the following:

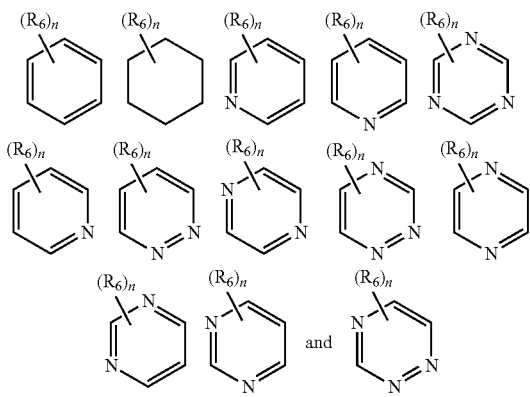

wherein, n is 0, 1, 2, 3, 4, or 5, in some embodiments n is 0, 1, or 2, and in some embodiments, n is 0 or 1; and $R_6$ is halo, haloalkyl, alkyl, alkenyl, alkynyl, aryl, heteroaryl, cycloalkyl, or heterocyclyl.

In one particular embodiment, the aromatic amide oligomer has the following general formula (IV):

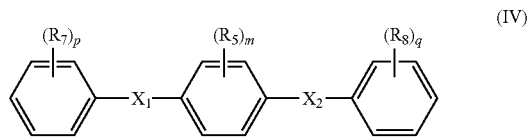

wherein, $X_1$ and $X_2$ are independently C(O)HN or NHC(O);

$R_5$, $R_7$, and $R_8$ are independently selected from halo, haloalkyl, alkyl, alkenyl, alkynyl, aryl, heteroaryl, cycloalkyl, and heterocyclyl;

m is from 0 to 4; and p and q are independently from 0 to 5.

In another embodiment, the aromatic amide oligomer has the following general formula (V):

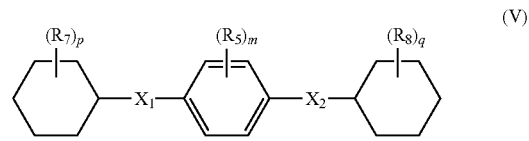

wherein, $X_1$, $X_2$, $R_5$, $R_7$, $R_8$, m, p, and q are as defined above.

For example, in certain embodiments, m, p, and q in Formula (IV) and Formula (V) may be equal to 0 so that the core and terminal aromatic groups are unsubstituted. In other embodiments, m may be 0 and p and q may be from 1 to 5. In such embodiments, for example, $R_7$ and/or $R_8$ may be halo (e.g., fluorine). In other embodiments, $R_7$ and/or $R_8$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_7$ and/or $R_8$ are phenyl substituted with —C(O)HN— or —NHC(O)—. In yet other embodiments, $R_7$ and/or $R_8$ may be heteroaryl (e.g., pyridinyl).

In yet another embodiment, the aromatic amide oligomer has the following general formula (VI):

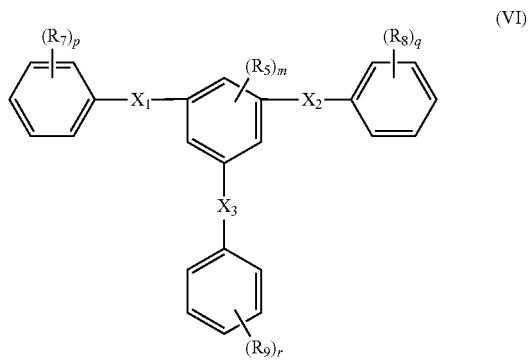

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, alkynyl, aryl, heteroaryl, cycloalkyl, and heterocyclyl;

m is from 0 to 3; and p, q, and r are independently from 0 to 5.

In yet another embodiment, the aromatic amide oligomer has the following general formula (VII):

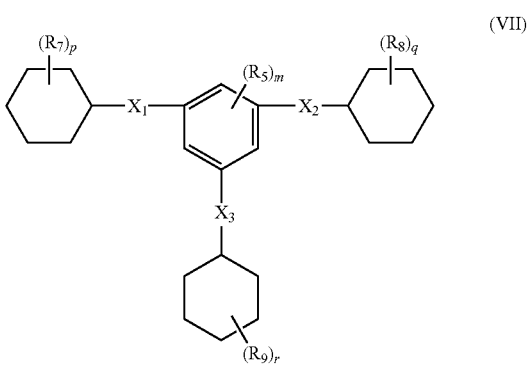

wherein, $X_1$, $X_2$, $X_3$, $R_5$, $R_7$, $R_8$, $R_9$, m, p, q, and r are as defined above.

For example, in certain embodiments, m, p, q, and r in Formula (VI) or in Formula (VII) may be equal to 0 so that the core and terminal aromatic groups are unsubstituted. In other embodiments, m may be 0 and p, q, and r may be from 1 to 5. In such embodiments, for example, $R_7$, $R_8$, and/or $R_9$ may be halo (e.g., fluorine). In other embodiments, $R_7$, $R_8$, and/or $R_9$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_7$, $R_8$, and/or $R_9$ are phenyl substituted with —C(O)HN— or —NHC(O)—. In yet other embodiments, $R_7$, $R_8$, and/or $R_9$ may be heteroaryl (e.g., pyridinyl).

Specific embodiments of the aromatic amide oligomer of the present invention are also set forth in the table below:

| Cmpd # | Structure | Name | MW (g/mol) |
|---|---|---|---|
| A | | N1,N4-diphenylterephthalamide | 316.4 |
| B | | N1,N4-diphenylisophthalamide | 316.4 |
| C | | N1,N4-bis(2,3,4,5,6-pentafluorophenyl)-terephthalamide | 496.3 |
| D | | N1,N4-bis(4-benzamidophenyl)terephthalamide | 554.6 |
| E | | N4-phenyl-N1[4-[[4-(phenylcarbamoyl)benzoyl]amino]phenyl]terephthalamide | 554.6 |
| F1 | | N4-phenyl-N1-[3-[[4-(phenylcarbamoyl)benzoyl]amino]phenyl]terephthalamide | 554.6 |

-continued

| Cmpd # | Structure | Name | MW (g/mol) |
|---|---|---|---|
| F2 | | N1,N3-bis(4-benzamidophenyl)benzene-1,3-dicarboxamide | 554.6 |
| G1 | | N3-phenyl-N1-[3-[[3-(phenylcarbamoyl)benzoyl]amino]phenyl]benzene-1,3-dicarboxamide | 554.6 |
| G2 | | N1,N3-bis(3-benzamidophenyl)benzene-1,3-dicarboxamide | 554.6 |
| H | | N1,N4-bis(4-pyridyl)terephthalamide | 318.3 |

-continued

| Cmpd # | Structure | Name | MW (g/mol) |
|---|---|---|---|
| I | | N1,N3-bis(4-phenylphenyl)benzene-1,3-dicarboxamide | 468.5 |
| J | | N1,N3,N5-triphenylbenzene-1,3,5-tricarboxamide | 435.5 |
| K | | N-(4,6-dibenzamido-1,3,5-triazin-2-yl)benzamide | 438.4 |
| L1 | | N2,N7-dicyclohexylnaphthalene-2,7-dicarboxamide | 378.5 |
| L2 | | N2,N6-dicyclohexylnaphthalene-2,6-dicarboxamide | 378.5 |
| N1 | | N1,N3-dicyclohexyl-1,3-Benzenedicarboxamide | 328.5 |

| Cmpd # | Structure | Name | MW (g/mol) |
|---|---|---|---|
| N2 | ![structure] | N1,N4-dicyclohexyl-1,4-Benzenedicarboxamide | 328.5 |

B. High Performance Polymers

The high performance polymers employed in the polymer composition are generally substantially amorphous or semi-crystalline in nature and have a relatively high glass transition temperature. For example, the glass transition temperature of the polymer may be about 100° C. or more, in some embodiments about 110° C. or more, in some embodiments from about 120° C. to about 260° C., and in some embodiments, from about 130° C. to about 230° C. The glass transition temperature may be determined as is well known in the art using differential scanning calorimetry ("DSC"), such as determined by ISO Test No. 11357. Particularly suitable high performance polymers are polyaryletherketones and/or polyetherimides, which are discussed in more detail below.

i. Polyaryletherketones

Polyaryletherketones are semi-crystalline polymers with a relatively high melting temperature, such as from about 300° C. to about 400° C., in some embodiments from about 310° C. to about 390° C., and in some embodiments, from about 330° C. to about 380° C. The glass transition temperature may likewise be about 100° C. or more, in some embodiments from about 110° C. to about 200° C., and in some embodiments, from about 130° C. to about 160° C. The melting and glass transition temperatures may be determined as is well known in the art using differential scanning calorimetry ("DSC"), such as determined by ISO Test No. 11357. Prior to combination with the aromatic amide oligomer, the initial polyaryletherketone may have a relatively high melt viscosity. In one particular embodiment, for example, the polyaryletherketone may have a melt viscosity of about 150 Pa-s or more, in some embodiments from about 155 to about 250 Pa-s, and in some embodiments, from about 160 to about 200 Pa-s, determined at a shear rate of 1000 seconds$^{-1}$. Melt viscosity may be determined in accordance with ISO Test No. 11443 (equivalent to ASTM Test No. 1238-70) at a temperature of 370° C.

Polyaryletherketones typically contain a moiety having the structure of Formula (VIII) and/or Formula (IX):

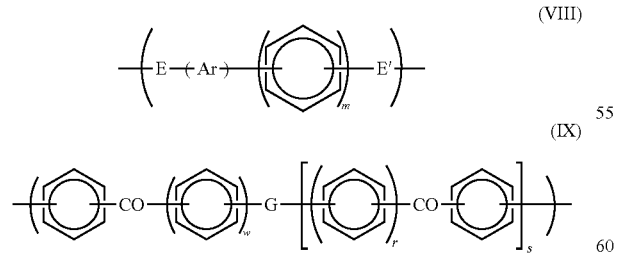

wherein, m and r are independently zero or a positive integer, in some embodiments from 0 to 3, in some embodiments from 0 to 2, and in some embodiments, 0 or 1;

s and w are independently zero or a positive integer, in some embodiments from 0 to 2, and in some embodiments, 0 or 1;

E and E' are independently an oxygen atom or a direct link;

G is an oxygen atom, a direct link, or —O-Ph-O— where Ph is a phenyl group; and

Ar is one of the following moieties (i) to (vi), which is bonded via one or more of phenyl moieties to adjacent moieties:

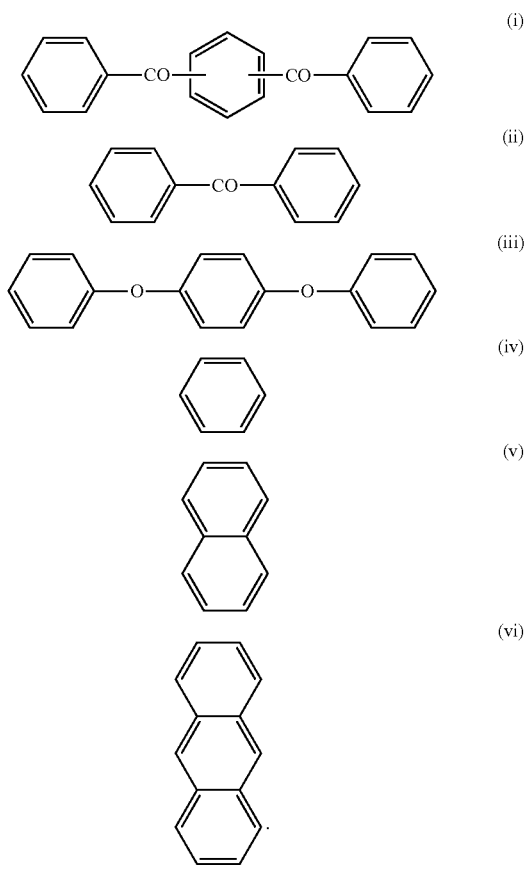

The polyaryletherketone may include more than one different type of repeat unit of Formula (VIII) and/or more than one different type of repeat unit of Formula (IX). Typically, however, only one type of repeat unit of Formula (VIII) or Formula (IX) is provided. In one particular embodiment, for example, the polyaryletherketone is a homopolymer or copolymer containing a repeat unit of the following general Formula (X):

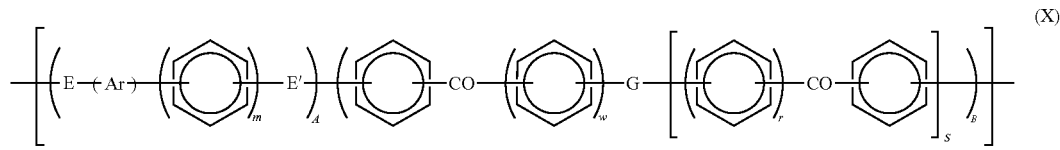

(X)

wherein,
A and B are independently 0 or 1; and
E, E', G, Ar, m, r, s and w are as described above.

In yet another embodiment, the polyaryletherketone is a homopolymer or copolymer containing a repeat unit of the following general Formula (XI):

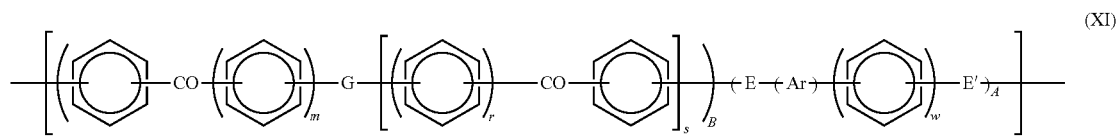

(XI)

wherein,
A and B are independently 0 or 1; and
E, E', G, Ar, m, r, s and w are as described above.

Desirably, Ar in the embodiments above is selected from the following moieties (vii) to (xiii):

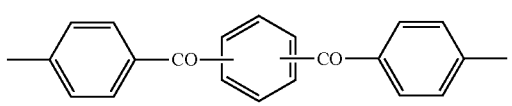

(vii)

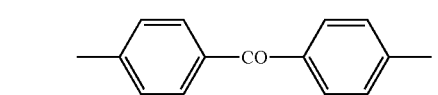

(viii)

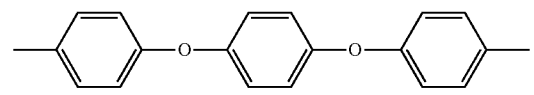

(ix)

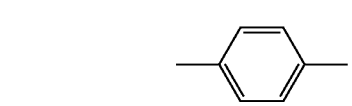

(x)

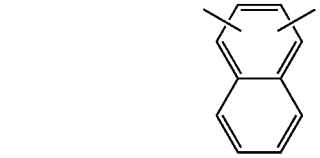

(xi)

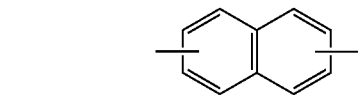

(xii)

-continued

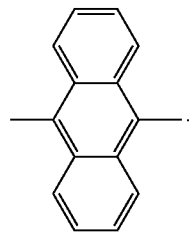

(xiii)

Particularly suitable polyaryletherketone polymers (or copolymers) are those of Formula (X) that primarily include phenyl moieties in conjunction with ketone and/or ether moieties. Examples of such polymers include polyetheretherketone ("PEEK") (wherein in Formula (X), Ar is moiety (iv), E and E' are oxygen atoms, m is 0, w is 1, G is a direct link, s is 0, and A and B are 1); polyetherketone ("PEK") (wherein in Formula (X), E is an oxygen atom, E' is a direct link, Ar is moiety (i), m is 0, A is 1, B is 0); polyetherketoneketone ("PEKK") (wherein in Formula (X), E is an oxygen atom, Ar is moiety (i), m is 0, E' is a direct link, A is 1, and B is 0); polyetherketoneetherketoneketone ("PEKEKK") (wherein in Formula (X), Ar is moiety (i), E and E' are oxygen atoms, G is a direct link, m is 0, w is 1, r is 0, s is 1, and A and B are 1); polyetheretherketoneketone ("PEEKK") (wherein in Formula (X), Ar is moiety (iv), E and E' are oxygen atoms, G is a direct link, m is 0, w is 0, and s, r, A and B are 1); polyetherdiphenyl-ether-ether-diphenyl-ether-phenyl-ketone-phenyl (wherein in Formula (X), Ar is moiety (iv), E and E' are oxygen atoms, m is 1, w is 1, A is 1, B is 1, r and s are 0, and G is a direct link); as well as blends and copolymers thereof.

ii. Polyetherimides

Another suitable type of high performance polymer that may be employed in combination with the aromatic amide oligomer is a polyetherimide. Generally, polyetherimides are substantially amorphous polymers with a relatively high glass transition temperature, such as about 150° C. or more, in some embodiments from about 180° C. to about 260° C., and in some embodiments, from about 200° C. to about 230° C. Prior to combination with the aromatic amide oligomer, the initial polyetherimide may have a relatively high melt viscosity. In one particular embodiment, for example, the polyetherimide may have a melt viscosity of about 550 Pa-s or more, in some embodiments from about 580 to about 1000 Pa-s, and in some embodiments, from about 600 to about 800 Pa-s, determined at a shear rate of 1000 seconds$^{-1}$. Melt viscosity may be determined in accordance with ISO Test No. 11443 (equivalent to ASTM Test No. 1238-70) at a temperature of 350° C.

Polyetherimides typically have the following general formula (XII):

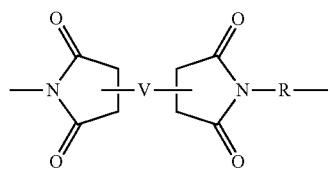
(XII)

wherein,

V is alkyl, alkenyl, alkynyl, aryl, heteroaryl, cycloalkyl, or heterocyclyl;

R is a substituted or unsubstituted divalent organic radical, such as aryl (e.g., 1,4-phenylene, 1,3-phenylene, etc.) alkenyl, heteroaryl, cycloalkyl, or heterocyclyl, or divalent radicals of the general formula (XIII):

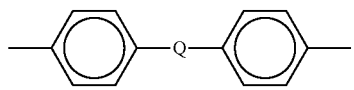
(XIII)

Q is a divalent radical, such as —$C_yH_{2y}$—, —C(O)—, —$SO_2$—, —O—, —S—, etc., and y is an integer of from 1 to 5, and in some embodiments, from 2 to 3.

Particularly suitable polyimides are polyetherimides containing repeating units of the formula (XIV):

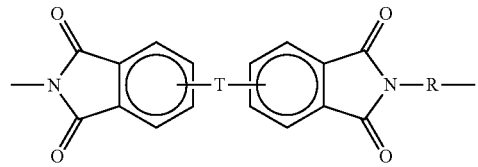
(XIV)

wherein,

T is —O— or —O—Z—O—;

R is as defined above; and

Z is selected from the following divalent radicals:

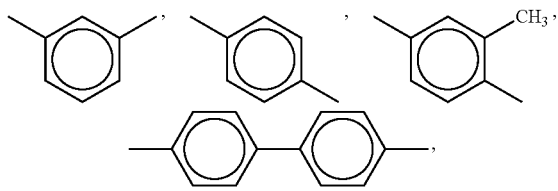

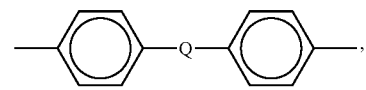

wherein, Q is as defined above.

In one embodiment, the polyetherimide may be a copolymer that, in addition to the etherimide units described above, further contains one or more of the following polyimide structural units:

wherein,

R is as defined above; and

M is selected from the following radicals:

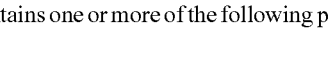

In a particularly suitable embodiment, the polyetherimide may contain repeating units according to formula (XIV), wherein R is phenyl (e.g., 1,4-phenylene, 1,3-phenylene, etc.) and T is the following divalent radical:

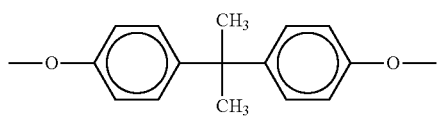

Various techniques may be employed to form the polyetherimides as is known in the art and described, for instance, in U.S. Pat. Nos. 3,847,867, 3,814,869, 3,850,885, 3,852,242, 3,855,178, 3,983,093, and 4,443,591. For example, the polyetherimide can be prepared by reaction of an aromatic bis(ether anhydride) and organic diamine in the presence of a solvent, such as o-dichlorobenzene, m-cresol/toluene, etc. Alternatively, the polyetherimide can be prepared by melt polymerization of aromatic bis(ether anhydride)s and diamines by heating a mixture of the starting materials to elevated temperatures with concurrent stirring. Chain stoppers and branching agents may also be employed in the reaction. When polyetherimide/polyimide copolymers are employed, a dianhydride (e.g., pyromellitic anhydride) may be used in combination with the bis(ether anhydride).

C. Liquid Crystalline Polymer

In addition to an aromatic amide oligomer and high performance polymer, the polymer composition of the present invention may optionally contain a liquid crystalline polymer. The term "liquid crystalline polymer" generally refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). Liquid crystalline polymers are generally classified as "thermotropic" to the extent that they can possess a rod-like structure and exhibit a crystalline behavior in their molten state (e.g., thermotropic nematic state). Because thermotropic liquid crystalline polymers form an ordered phase in the melt state, they can have a relatively low shear viscosity and thus act as a secondary flow aid for the high performance polymer. In fact, the present inventors have discovered that the combination of a liquid crystalline polymer and aromatic amide oligomer can have a synergistic effect on the polymer composition by reducing its melt viscosity to a value below which either additive could achieve individually. The liquid crystalline polymer may also help in further improving certain mechanical properties of the polymer composition, such as described in more detail below.

When employed, liquid crystalline polymer(s) typically constitute from about 0.5 to about 50 parts, in some embodiments from about 0.8 to about 20 parts, and in some embodiments, from about 1 to about 15 parts by weight relative to 100 parts by weight of the high performance polymer(s). Liquid crystalline polymers may, for example, constitute from about 1 wt. % to about 40 wt. %, in some embodiments from about 3 wt. % to about 35 wt. %, and in some embodiments, from about 5 wt. % to about 30 wt. % of the polymer composition.

The liquid crystalline polymers may be formed from one or more types of repeating units as is known in the art. The liquid crystalline polymers may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (XV):

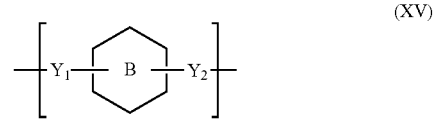

wherein, ring B is a substituted or unsubstituted 6-membered aryl group (e.g., 1,4-phenylene, 1,3-phenylene, or 1,2-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula XV are C(O)), aromatic hydroxycarboxylic repeating units ($Y_1$ is O and $Y_2$ is C(O) in Formula XV), as well as various combinations thereof.

Aromatic dicarboxylic repeating units, for instance, may be employed that are derived from aromatic dicarboxylic acids, such as terephthalic acid, phthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 0.5 mol. % to about 50 mol. %, in some embodiments from about 1 mol. % to about 30 mol. %, and in some embodiments, from about 5 mol. % to about 20% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 20 mol. % to about 85 mol. %, in some embodiments from about 40 mol. % to about 80 mol. %, and in some embodiments, from about 50 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, 4,4'-dihydroxybiphenyl sulfone, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 35 mol. %, in some embodiments from about 2 mol. % to about 30 mol. %, and in some embodiments, from about 5 mol. % to about 25% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, 4,4'-diamino biphenyl sulfone, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

In certain embodiments, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 15 mol. %, in some embodiments no more than about 13 mol. %, in some embodiments no more than about 10 mol. %, in some embodiments no more than about 8 mol. %, and in some embodiments, from 0 mol. % to about 5 mol. % of the polymer (e.g., 0 mol. %). In one particular embodiment, for example, a "low naphthenic" aromatic polyester may be formed that contains monomer repeat units derived from 4-hydroxybenzoic acid ("HBA"), terephthalic acid ("TA") and/or isophthalic acid ("IA"); as well as various other optional constituents. The monomer units derived from 4-hydroxybenzoic acid ("HBA") may constitute from about 40 mol. % to about 95 mol. %, in some embodiments from about 45 mol. % to about 90 mol. %, and in some embodiments, from about 50 mol. % to about 80 mol. % of the polymer, while the monomer units derived from terephthalic acid ("TA") and/or isophthalic acid ("IA") may each constitute from about 1 mol. % to about 30 mol. %, in some embodiments from about 2 mol. % to about 25 mol. %, and in some embodiments from about 5 mol. % to about 20 mol. % of the polymer. Other possible monomer repeat units include aromatic diols, such as 4,4'-biphenol ("BP"), hydroquinone ("HQ"), etc. and aromatic amides, such as acetaminophen ("APAP"). In certain embodiments, for example, BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain a small amount of 6-hydroxy-2-naphthoic acid ("HNA") within the ranges noted above.

The liquid crystalline polymer may have a relatively high melting temperature. For example, the melting temperature may range from about 150° C. to about 400° C., in some embodiments from about 250° C. to about 390° C., and in some embodiments, from about 300° C. to about 380° C. Likewise, the crystallization temperature may range from about 100° C. to about 300° C., in some embodiments from about 150° C. to about 290° C., and in some embodiments, from about 240° C. to about 280° C. The melting and crystallization temperatures may be determined as is well known in the art using differential scanning calorimetry ("DSC"), such as determined by ISO Test No. 11357.

D. Other Components

If desired, the polymer composition may also be combined with a wide variety of other types of components. For example, a filler material may be incorporated into the polymer composition to form a filled composition with enhanced strength and/or surface properties. A filled polymer composition can include, for example, a mineral filler and/or a fiber filler optionally in conjunction with one or more other additives as are generally known in the art.

Fibers may be employed as a filler material to improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The relative amount of the fibers in the filled polymer composition may also be selectively controlled to help achieve the desired mechanical properties without adversely impacting other properties of the composition, such as its flowability. For example, the fibers may constitute from about 2 wt. % to about 40 wt. %, in some embodiments from about 5 wt. % to about 35 wt. %, and in some embodiments, from about 6 wt. % to about 30 wt. % of the filled polymer composition. Although the fibers may be employed within the ranges noted above, small fiber contents may be employed while still achieving the desired mechanical properties. For example, the fibers can be employed in small amounts such as from about 2 wt. % to about 20 wt. %, in some embodiments, from about 5 wt. % to about 16 wt. %, and in some embodiments, from about 6 wt. % to about 12 wt. %.

Mineral fillers may be employed as a filler material to improve mechanical properties. Mineral fillers may, for instance, be employed in the filled polymer composition to help achieve the desired mechanical properties and/or appearance. Such fillers are particularly desirable when forming thermoformed articles. When employed, mineral fillers typically constitute from about 5 wt. % to about 60 wt. %, in some embodiments from about 10 wt. % to about 55 wt. %, and in some embodiments, from about 20 wt. % to about 50 wt. % of the filled polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2(H_2O)]$), montmorillonite (($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Still other additives that can be included in the filled polymer composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Method for Forming the Polymer Composition

The manner in which the oligomer and the high performance polymer are combined may vary as is known in the art. For instance, the raw materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the high performance polymer and oligomer may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 200° C. to about 500° C., and in some embodiments, from about 250° C. to about 400° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

Besides melt blending, other techniques may also be employed to combine the oligomer and the high performance polymer. For example, the oligomer may be supplied during one or more stages of the polymerization of the high performance polymer. The aromatic amide oligomer may also be added to the polymerization apparatus. Although it may be introduced at any time, it is typically desired to apply the oligomer before polymerization has been initiated, and typically in conjunction with the precursor monomers for the high performance polymer.

Regardless of the manner in which it is introduced, the aromatic amide oligomer may lower the melt viscosity of the resulting polymer composition. The melt viscosity may, for instance, be reduced so that the ratio of the melt viscosity of polymer composition to the initial viscosity of the high performance polymer may be about 0.98 or less, in some embodiments about 0.95 or less, in some embodiments, from about 0.01 to about 0.90, in some embodiments from about 0.02 to about 0.85, and in some embodiments, from about 0.05 to about 0.50. In one particular embodiment, such as when a polyaryletherketone is employed, the polymer composition may have a melt viscosity of from about 1 to about 165 Pa-s, in some embodiments from about 20 to about 150 Pa-s, and in some embodiments, from about 50 to about 140 Pa-s. In yet another embodiment, such as when a polyetherimide is employed, the polymer composition may have a melt viscosity of from about 1 to about 400 Pa-s, in some embodiments from about 10 to about 300 Pa-s, and in some embodiments, from about 25 to about 150 Pa-s. Melt viscosity may be determined in accordance with ISO Test No. 11443 (equivalent to ASTM Test No. 1238-70) at a shear rate of 1000 seconds$^{-1}$ and temperature of 350° C., 370° C., or 390° C.

The resulting polymer composition may also exhibit a relatively high glass transition temperature. Nevertheless, due to the interaction of the oligomer with the high performance polymer, the glass transition temperature may be reduced so that the ratio of the glass transition temperature of the polymer composition to the initial glass transition temperature of the high performance polymer may be about 0.98 or less, in some embodiments about 0.95 or less, in some embodiments, from about 0.01 to about 0.90, in some embodiments from about 0.02 to about 0.85, and in some embodiments, from about 0.05 to about 0.50. For example, the glass transition temperature of the polymer composition may be about 50° C. or more, in some embodiments about 70° C. or more, in some embodiments from about 80° C. to about 260° C., and in some embodiments, from about 90° C. to about 200° C. The glass transition temperature may be determined as is well known in the art using differential scanning calorimetry ("DSC"), such as determined by ISO Test No. 11357.

In addition, the polymer composition may also exhibit excellent strength properties. In fact, in certain embodiments, the polymer composition may actually exhibit better strength than can be achieved by the high performance polymer alone. By way of example, the polymer composition may have a tensile strength of about 30 Megapascals ("MPa") or more, in some embodiments about 40 MPa or more, and in some embodiments, from about 50 to about 250 MPa, as well as a tensile modulus of about 30 MPa or more, in some embodiments about 40 MPa or more, and in some embodiments, from about 50 to about 250 MPa. Tensile properties can be determined according to ISO Test No. 527 (technically equivalent to ASTM D638) at a temperature of 23° C. and at a test speed of 5 mm/min. The polymer composition may also have a flexural modulus of about 30 MPa or more, in some embodiments about 35 MPa or more, and in some embodiments, from about 40 to about 150 MPa, as determined according to ISO Test No. 178 (technically equivalent to ASTM D790) at a temperature of 23° C. The polymer composition may have a notched Charpy impact strength of about 2 kJ/m² or more, in some embodiments about 3 kJ/m² or more, and in some embodiments, from about 4 to about 10 kJ/m² as determined according to ASTM D256, Method B (technically equivalent to ISO 179-1) at 23° C. Furthermore, the polymer composition may have a deflection temperature under load ("DTUL") of about 130° C. or more, in some embodiments about 140° C. or more, and in some embodiments, from about 145° C. to about 250° C., as determined according to ASTM D648-07 (technically equivalent to ISO Test No. 75-2) at a specified load of 1.8 MPa.

The present invention may be better understood with reference to the following examples.

Test Methods

Melt Viscosity:

The melt viscosity (Pa-s) may be determined in accordance with ISO Test No. 11443:2005 (or ASTM D3835) at a shear rate of 1000 s$^{-1}$ and temperature of, for example, 350° C., 370° C., or 390° C., using a Dynisco 7001 capillary rheometer. The temperature may vary as is known in the art depending on the melting temperature of the polymer. For this test, the rheometer orifice (die) may have a diameter of 1 mm, length of 20 mm, L/D ratio of 20.1, and an entrance angle of 180°. The diameter of the barrel may also be 9.55 mm±0.005 mm and the length of the rod may be 233.4 mm.

Complex Viscosity:

The complex viscosity is used herein as an estimate for the "low shear" viscosity of the polymer composition at low frequencies. Complex viscosity is a frequency-dependent viscosity, determined during forced harmonic oscillation of shear stress at angular frequencies of 0.15 and 500 radians per second. Measurements may be determined at a constant temperature of 350° C. and at a constant strain amplitude of 1% using an ARES-G2 rheometer (TA Instruments) with a parallel plate configuration (25 mm plate diameter).

Glass Transition Temperatures:

The glass transition temperature ("Tg") may be determined by differential scanning calorimetry ("DSC") as is known in the art and described in ISO Test No. 11357. For crystalline or semi-crystalline materials, the melting temperature ("Tm") may also be determined as the differential scanning calorimetry (DSC) peak melt temperature. Under the DSC procedure, samples may be heated and cooled at 20° C. per minute as stated in ISO Standard 10350 using DSC measurements conducted on a TA Q2000 Instrument.

Deflection Under Load Temperature ("DTUL"):

The deflection under load temperature may be determined in accordance with ISO Test No. 75-2 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2).

Tensile Properties:

Tensile properties may be tested according to ISO Test No. 527 (technically equivalent to ASTM D638). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Properties:

Flexural properties may be tested according to ISO Test No. 178 (technically equivalent to ASTM D790). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength:

Notched Charpy properties may be tested according to ISO Test No. ISO 179-1) (technically equivalent to ASTM D256, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Synthesis of N1,N4-diphenylterephthalamide

Compound A

The synthesis of Compound A from terephthaloyl chloride and aniline may be performed according to the following scheme:

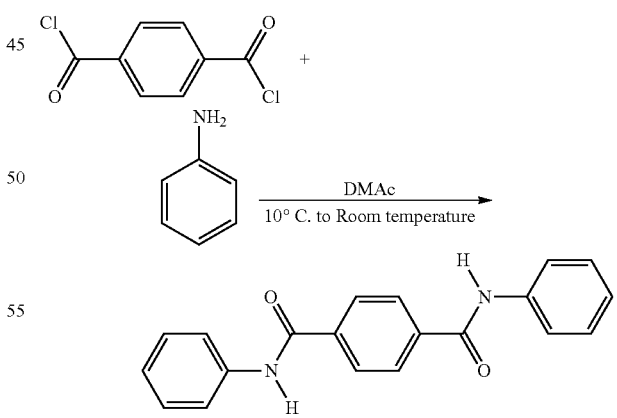

The experimental set up consisted of a 2 L glass beaker equipped with a glass rod stirrer coupled with an overhead mechanical stirrer. Dimethyl acetamide ("DMAc") (3 L) was added to the beaker and the beaker was immersed in an ice bath to cool the system to 10-15° C. Then aniline (481.6 g) was added to the solvent with constant stirring, the resultant mixture was cooled to 10-15° C. Terephthaloyl chloride (300 g) was added gradually to the cooled stirred mixture such that the temperature of the reaction was maintained below 30° C. The acid chloride was added over a period of one-two hours, after which the mixture was stirred for another three hours at 10-15° C. and then at room temperature overnight. The reaction mixture was milky white (a fine suspension of the product in the solvent) and was vacuum filtered using a filter paper and a Buchner funnel. The crude product was washed with acetone (2 L) and then washed with hot water (2 L). The product was then air dried over night at room temperature and then was dried in a vacuum oven 150° C. for 4-6 hours. The product (464.2 g) was a highly crystalline white solid. The melting point was 346-348° C., as determined by differential scanning calorimetry ("DSC").

Synthesis of N1. N3-diphenylisophthalamide

Compound B

The synthesis of Compound B from isophthaloyl chloride and aniline may be performed according to the following scheme:

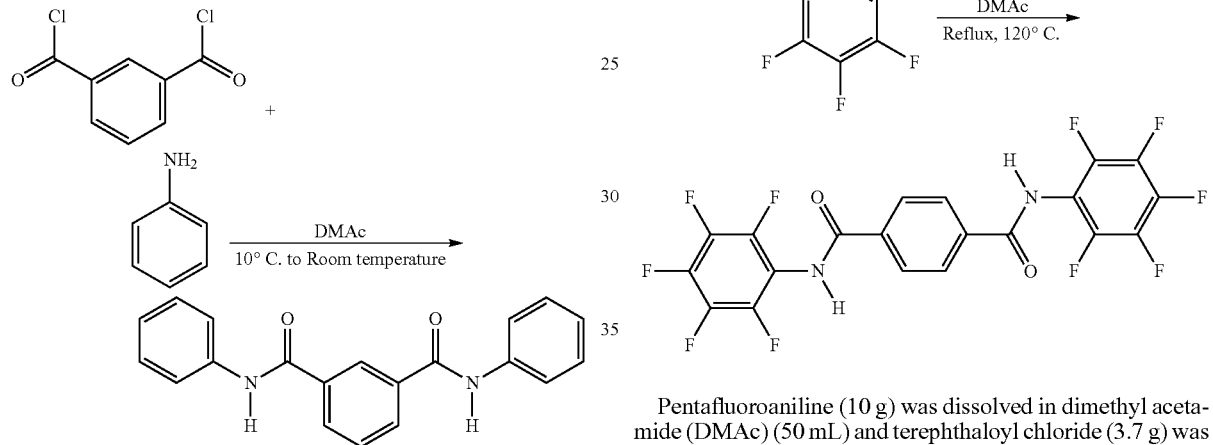

The experimental set up consisted of a 2 L glass beaker equipped with a glass rod stirrer coupled with an overhead mechanical stirrer. DMAc (1.5 L) was added to the beaker and the beaker was immersed in an ice bath to cool the solvent to 10-15° C. Then aniline (561.9 g) was added to the solvent with constant stirring, the resultant mixture was cooled to 10-15° C. Isophthaloyl chloride (350 g dissolved in 200 g of DMAc) was added gradually to the cooled stirred mixture such that the temperature of the reaction was maintained below 30° C. The acid chloride was added over a period of one hour, after which the mixture was stirred for another three hours at 10-15° C. and then at room temperature overnight. The reaction mixture was milky white in appearance. The product was recovered by precipitation by addition of 1.5 L of distilled water and followed by was vacuum filtration using a filter paper and a Buchner funnel. The crude product was then washed with acetone (2 L) and then washed again with hot water (2 L). The product was then air dried over night at room temperature and then was dried in a vacuum oven 150° C. for 4-6 hours. The product (522 g) was a white solid. The melting point was 290° C. as determined by DSC.

Synthesis of N1,N4-bis(2,3,4,5,6-pentafluorophenyl) terephthalamide

Compound C

The synthesis of Compound C from pentafluorophenol and terephthaloyl chloride may be performed according to the following scheme:

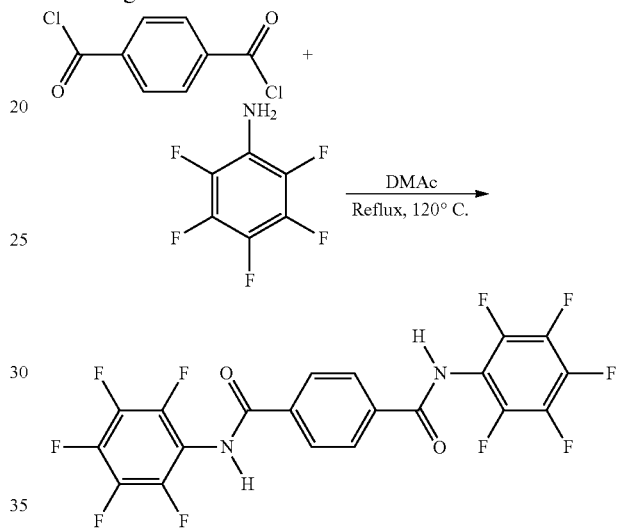

Pentafluoroaniline (10 g) was dissolved in dimethyl acetamide (DMAc) (50 mL) and terephthaloyl chloride (3.7 g) was added in one portion. The reaction mixture was stirred and then refluxed for six (6) hours at 120° C. The reaction mixture was then cooled and 200 mL water was added to the mixture to precipitate the crude product. The product was then filtered and dried. The crude product was then washed with acetone (100 mL) and dried to give a white powder as the final product (6.8 g). The melting point by DSC was 331.6° C.

Synthesis of N4-phenyl-N1-[4-[[4-(phenylcarbamoyl)benzoyl]amino]phenyl]terephthalamide Compound E The synthesis of Compound E from 4-amino benzanilide and terephthaloyl chloride can be performed according to the following scheme:

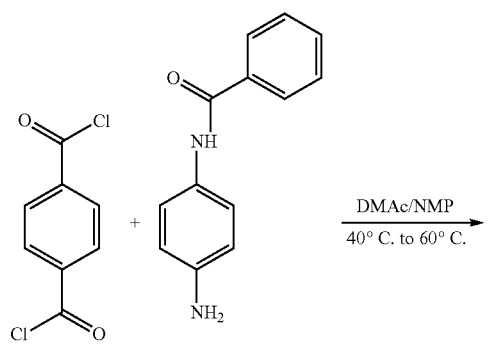

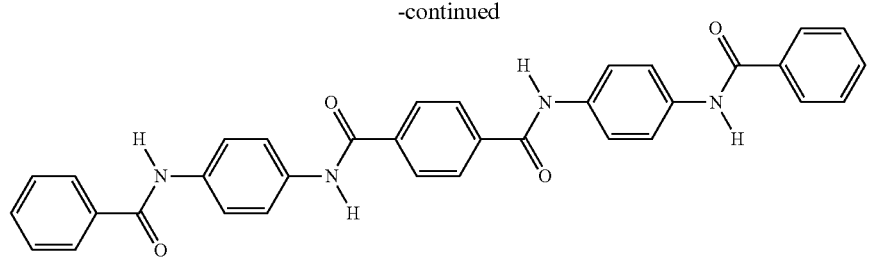

The experimental setup consisted of a 1 L glass beaker equipped with a glass rod stirrer coupled with an overhead mechanical stirrer. 4-aminobenzanilide (20.9 g) was dissolved in warm DMAc (250 mL) (alternatively N-methyl pyrrolidone can also be used). Terephthaloyl chloride (10 g) was added to the stirred solution of the diamine maintained at 40-50° C., upon the addition of the acid chloride the reaction temperature increased from 50° C. to 80° C. After the addition of the acid chloride was completed, the reaction mixture was warmed to 70-80° C. and maintained at that temperature for about three hours and allowed to rest overnight at room temperature. The product was then isolated by the addition of water (500 mL) followed by vacuum filtration followed by washing with hot water (1 L). The product was then dried in a vacuum oven at 150° C. for about 6-8 hours, to give a pale yellow colored solid (yield ca. 90%). The melting point by DSC was 462° C.

Synthesis of N1,N3-bis(4-benzamidophenyl)benzene-1,3-dicarboxamide

Compound F2

The synthesis of Compound F2 from 1,4-phenylene diamine, terephthaloyl chloride, and benzoyl chloride may be performed according to the following scheme:

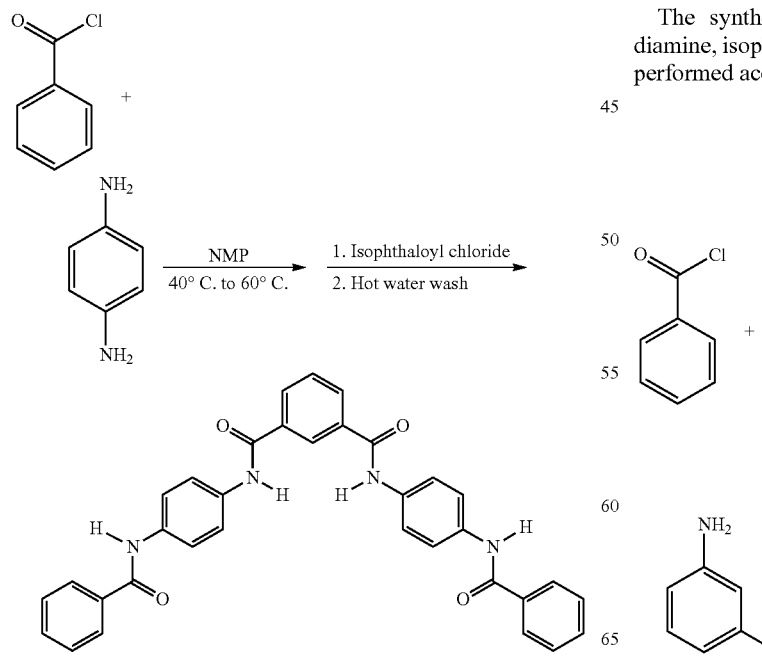

The experimental setup consisted of a 500 mL glass beaker equipped with a magnetic stirrer. 1,4 phenylene diamine (20 g) was dissolved in warm NMP (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and then allowed to cool to 50° C. After cooling to the desired temperature, isophthaloyl chloride (18.39 g) was added in small portions such that the temperature of the reaction mixture did not increase above 70° C. The mixture was then stirred for additional one (1) hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (51 g). The melting point by DSC was 329° C.

Synthesis of N1,N3-bis(3-benzamidophenyl)benzene-1,3-dicarboxamide

Compound G2

The synthesis of Compound G2 from 1,3-phenylene diamine, isophthaloyl chloride, and benzoyl chloride may be performed according to the following scheme:

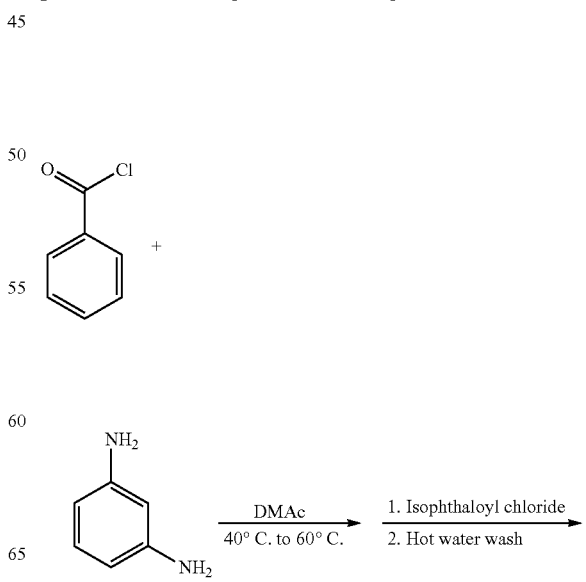

-continued

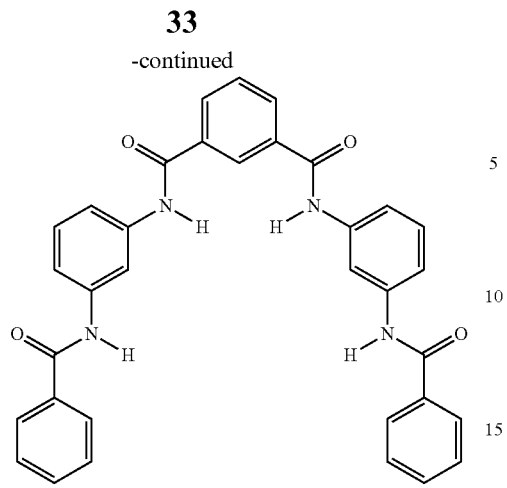

The experimental setup consisted of a 500 mL glass beaker equipped with a magnetic stirrer. 1,3 phenylene diamine (20 g) was dissolved in warm DMAc (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and allowed to cool to 50° C. After cooling to the desired temperature, isophthaloyl chloride (18.39 g) was added in small portions such that the temperature of the reaction mixture did not increase above 70° C. The mixture was then stirred for additional one hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (45 g).

Synthesis of
N1,N3,N5-triphenylbenzene-1,3,5-tricarboxamide

Compound J

Compound J was synthesized from trimesoyl chloride and aniline according to the following scheme:

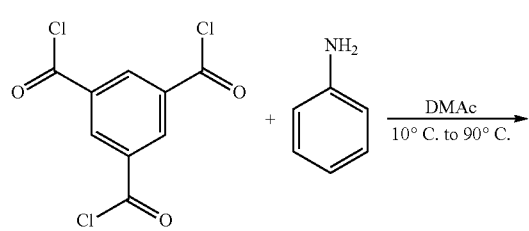

-continued (J)

The experimental set up consisted of a 2 L glass beaker equipped with a glass rod stirrer coupled with an overhead mechanical stirrer. Trimesoyl chloride (200 g) was dissolved in dimethyl acetamide ("DMAc") (1 L) and cooled by an ice bath to 10-20° C. Aniline (421 g) was added drop wise to a stirred solution of the acid chloride over a period of 1.5 to 2 hours. After the addition of the amine was completed, the reaction mixture was stirred additionally for 45 minutes, after which the temperature was increased to 90° C. for about 1 hour. The mixture was allowed to rest overnight at room temperature. The product was recovered by precipitation through the addition of 1.5 L of distilled water, which was followed by was vacuum filtration using a filter paper and a Buchner funnel. The crude product was washed with acetone (2 L) and then washed again with hot water (2 L). The product was then air dried over night at room temperature and then was dried in a vacuum oven 150° C. for 4 to 6 hours. The product (250 g) was a white solid, and had a melting point of 319.6° C., as determined by differential scanning calorimetry ("DSC").

Synthesis of
N1,N3-dicyclohexyl-1,3-Benzenedicarboxamide

Compound N1

The synthesis of Compound N1 from isophthaloyl chloride and cyclohexyl amine can be performed according to the following scheme:

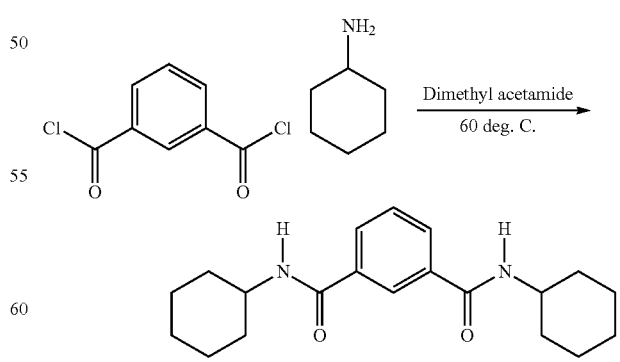

The experimental set up consisted of a 1 L glass beaker equipped with a glass rod stirrer coupled with an overhead mechanical stirrer. Cyclohexyl amine (306 g) was mixed in dimethyl acetamide (1 L) (alternatively N-methyl pyrrolidone can also be used) and triethyl amine (250 g) at room temperature. Next isophthaloyl chloride (250 g) was slowly added over a period of 1.5 to 2 hours, to the amine solution with constant stirring. The rate of addition of the acid chloride was maintained such that the reaction temperature was maintained less than 60° C. After complete addition of the benzoyl chloride, the reaction mixture was gradually warmed to 85-90° C. and then allowed to cool to around 45-50° C. The mixture was allowed to rest overnight (for at least 3 hours) at room temperature. The product was recovered by precipitation through the addition of 1.5 L of distilled water, which was followed by was vacuum filtration using a filter paper and a Buchner funnel. The crude product was then washed with acetone (250 mL) and washed again with hot water (500 mL). The product (yield: ca. 90%) was then air dried over night at room temperature and then was dried in a vacuum oven 150° C. for 4 to 6 hours. The product was a white solid. The Proton NMR characterization was as follows: $^1$H NMR (400 MHz de-DMSO): 8.3 (s, 2H, CONH), 8.22 (s, 1H, Ar), 7.9 (d, 2H, Ar), 7.5 (s, 1H, Ar), 3.7 (broad s, 2H, cyclohexyl), 1.95-1.74 broad s, 4H, cyclohexyl) and 1.34-1.14 (m, 6H, cyclohexyl).

Example 1

Compound A is synthesized as described above and tested for its influence on the melt viscosity of VICTREX™ 150GL30, a commercial grade of polyetheretherketone ("PEEK") available from Victrex Manufacturing, Ltd. More particularly, the polymer is heated at 120° C. The hot pellets are then coated with Compound A and melt mixed using a Leistritz 18 mm co-rotating fully intermeshing twin screw extruder having 6 temperature control zones (including at the extrusion die) and an overall L/D of 30. A general purpose screw design is used to compound the oligomer into a resin matrix. All materials are fed to the feed throat in the first barrel by means of a volumetric feeder. Materials are melted and mixed then extruded through a single hole strand die. Material is then quenched in a water bath to solidify and granulated in a pelletizer. The resultant pellets are dried for 3 hours at 120° C. and scanning shear capillary melt viscosity measurements were carried out at 370° C. The results are set forth below.

| Comp. | PEEK | PEEK + 5 wt. % Compound A | PEEK + 10 wt. % Compound A |
|---|---|---|---|
| Melt Viscosity (1000 s$^{-1}$) (Pa-s) | 169.1 | 135.1 | 104.3 |
| Ratio of Blend MV to Initial MV (1000$^{-1}$) | — | 0.80 | 0.62 |

As indicated, a melt viscosity reduction (increase in the flow) of approximately 40% (ratio of 0.62) can be achieved through the addition of Compound A.

Example 2

Compound E is synthesized as described above and compounded with VICTREX™ 150GL30 as described in Example 1.

Example 3

Figure 6:
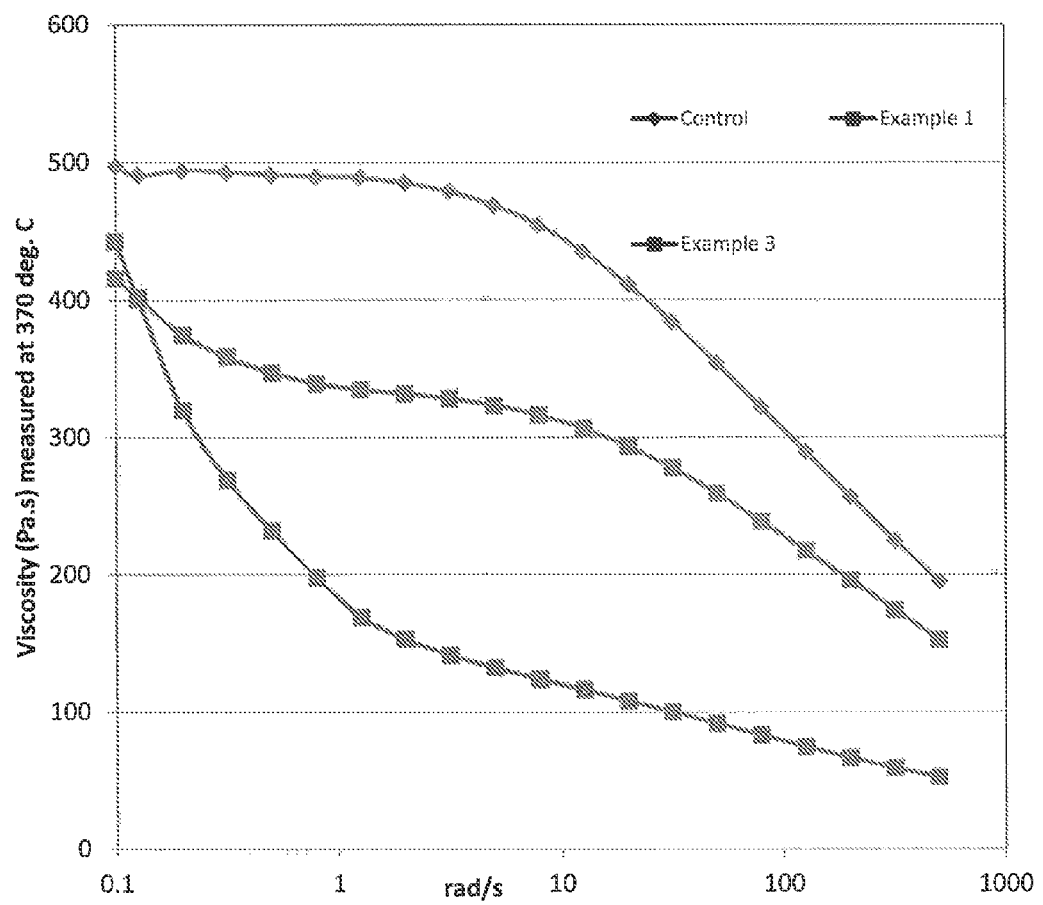
FIG. 6 is a graph showing complex viscosity (Pa*s) versus frequency (rad/s) for the samples of Example 3.

Compound A is employed in combination with VECTRA® E950i (liquid crystalline polymer available from Ticona, LLC) and tested for their influence on the melt viscosity of VICTREX™ 150GL30 as described in Example 1. The resultant pellets are then dried for 3 hours at 120° C. Complex viscosity measurements are then carried out at 370° C. for Example 1 (5 wt. % Compound A) and Example 3 (5 wt. % Compound A and 15 wt. % LCP) and compared to VICTREX™ 150GL30 without the addition of Compound A ("Control"). The results are set forth in FIG. 6. As shown, the use of Compound A in Examples 1 and 3 resulted in a significant decrease in viscosity at various frequencies (e.g., 500 rad/s).

Example 4

Several of the pellets of Examples 1 and 3 are also injection molded to obtain specimen samples for tensile, impact, flexural and heat distortion temperature measurements. The results are set forth below.

| Comp. | PEEK | PEEK + 5 wt. % Compound A | PEEK + 5 wt. % Compound A + 15 wt. % LCP |
|---|---|---|---|
| Flexural Modulus (MPa) | 36.77 | 40.87 | 48.5 |
| Tensile Modulus (MPa) | 38.84 | 41.99 | 50.57 |
| Tensile Break Stress (MPa) | 90.66 | 85.98 | 99.05 |
| Charpy Notched (kJ/m) | 4.6 | 3.1 | 3.2 |
| DTUL (° C.) | 150.3 | 139 | 143.4 |

As indicated, good mechanical properties are observed for the compositions of the present invention.

Example 5

Compound A is synthesized as described above and tested for its influence on the melt viscosity of Ultem® 1010, a commercial grade of polyetherimide ("PEI") available from Sabic. More particularly, the polymer is heated at 120° C. The hot pellets are then coated with Compound A and melt mixed using a Leistritz 18 mm co-rotating fully intermeshing twin screw extruder having 6 temperature control zones (including at the extrusion die) and an overall L/D of 30. A general purpose screw design is used to compound the oligomer into a resin matrix. All materials are fed to the feed throat in the first barrel by means of a volumetric feeder. Materials are melted and mixed then extruded through a single hole strand die. Material is then quenched in a water bath to solidify and granulated in a pelletizer. The resultant pellets are dried for 3 hours at 120° C. and scanning shear capillary melt viscosity measurements were carried out at 350° C. The results are set forth below.

| Comp. | PEI | PEI + 5 wt. % Compound A |
|---|---|---|
| Melt Viscosity (1000 s$^{-1}$) (Pa-s) | 626.4 | 377.6 |
| Ratio of Blend MV to Initial MV (1000$^{-1}$) | — | 0.60 |

As indicated, a melt viscosity reduction (increase in the flow) of approximately 40% (ratio of 0.60) can be achieved through the addition of Compound A.

Example 6

Compound A is employed in combination with VECTRA® E950i (liquid crystalline polymer available from Ticona, LLC) and tested for their influence on the melt viscosity as described in Example 5. The results are set forth below.

| Comp. | PEI | PEI + 5 wt. % Compound A + 15 wt. % LCP |
|---|---|---|
| Melt Viscosity (1000 s$^{-1}$) (Pa-s) | 626.4 | 67.0 |
| Ratio of Blend MV to Initial MV (1000$^{-1}$) | — | 0.11 |

As indicated, a melt viscosity reduction (increase in the flow) of approximately 90% (ratio of 0.11) can be achieved through the addition of Compound A.

Example 7

Several of the pellets of Examples 5 and 6 are also injection molded to obtain specimen samples for tensile, impact, flexural and heat distortion temperature measurements. The results are set forth below.

| Comp. | PEI | PEI + 5 wt. % Compound A | PEI + 5 wt. % Compound A + 15 wt. % LCP |
|---|---|---|---|
| Flexural Modulus (MPa) | 3183 | 3657 | 4697 |
| Flexural Break Stress (MPa) | 105.7 | 116.8 | 117.1 |
| Tensile Modulus (MPa) | 3183 | 3327 | 4705 |
| Tensile Break Stress (MPa) | 84 | 100.6 | 63.14 |
| Charpy Notched (kJ/m) | 3 | 3 | 3.8 |
| DTUL (° C.) | 193 | 173 | 171 |

As indicated, good mechanical properties are observed for the compositions of the present invention.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a high performance polymer having a glass transition temperature of about 100° C. or more and an aromatic amide oligomer having the following general formula (I):

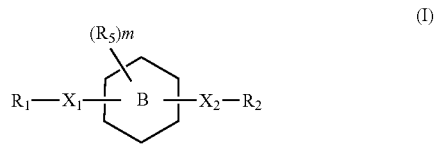

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl,
wherein the high performance polymer is a polyetherimide.

2. The polymer composition of claim 1, wherein the aromatic amide oligomer has a molecular weight of about 2,000 grams per mole or less.

3. The polymer composition of claim 1, wherein ring B is phenyl.

4. The polymer composition of claim 1, wherein the aromatic amide oligomer has the following general formula (II):

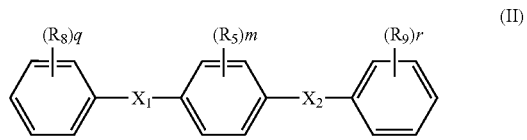

wherein,
$X_1$ and $X_2$ are independently C(O)HN or NHC(O);
$R_5$, $R_8$, and $R_9$ are independently selected from halo, haloalkyl, alkyl, alkenyl, alkynyl, aryl, heteroaryl, cycloalkyl, and heterocyclyl;
m is from 0 to 4; and
q and r are independently from 0 to 5.

5. The polymer composition of claim 4, wherein m, q, and r are 0.

6. The polymer composition of claim 4, wherein $R_8$ and $R_9$ are phenyl substituted with —C(O)HN— or —NHC(O)—.

7. The polymer composition of claim 1, wherein the oligomer is selected from the group consisting of the following compounds and combinations thereof:

| Structure | Name |
|---|---|
| ![structure] | N1,N4-diphenylterephthalamide |

-continued

| Structure | Name |
|---|---|
| | N1,N4-diphenylisophthalamide |
| | N1,N4-bis(2,3,4,5,6-pentafluorophenyl)-terephthalamide |
| | N1,N4-bis(4-benzamidophenyl)terephthalamide |
| | N4-phenyl-N1-[4-[[4-(phenylcarbamoyl)benzoyl]amino]phenyl]terephthalamide |
| | N4-phenyl-N1-[3-[[4-(phenylcarbamoyl)benzoyl]amino]phenyl]terephthalamide |

-continued

| Structure | Name |
|---|---|
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |
| | N1,N3-bis(3-benzamidophenyl)benzene-1,3-dicarboxamide |
| | N1,N4-bis(4-pyridyl)terephthalamide |
| | N1,N3-bis(4-phenylphenyl)benzene-1,3-dicarboxamide |

-continued

| Structure | Name |
|---|---|
| | N1,N3,N5-triphenylbenzene-1,3,5-tricarboxamide |
| | N-(4,6-dibenzamido-1,3,5-triazin-2-yl)benzamide |
| | N2,N7-dicyclohexylnaphthalene-2,7-dicarboxamide |
| | N2,N6-dicyclohexylnaphthalene-2,6-dicarboxamide |
| | N1,N3-dicyclohexyl-1,3-Benzenedicarboxamide |
| | N1,N4-dicyclohexyl-1,4-Benzenedicarboxamide |

8. The polymer composition of claim 1, wherein the aromatic amide oligomer is N1,N4-diphenylterephthalamide, N1,N3-diphenylisophthalamide, N1,N3-dicyclohexyl-1,3-benzenedicarboxamide, or N1,N4-dicyclohexyl-1,4-benzenedicarboxamide.

9. The polymer composition of claim 1, wherein the high performance polymer has a glass transition temperature of from about 130° C. to about 230° C.

10. The polymer composition of claim 1, wherein the polyetherimide has a melt flow rate of about 550 Pa-s or more, as determined in accordance with ISO Test No. 11443 at a shear rate of 1000 s$^{-1}$ and temperature of 350° C.

11. The polymer composition of claim 1, wherein the polyetherimide contains repeating units of the formula (XIV):

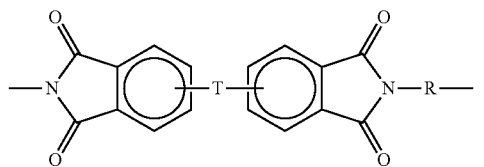

(XIV)

wherein,
R is a substituted or unsubstituted divalent organic radical;
T is —O— or —O—Z—O—; and
Z is selected from the following divalent radicals:

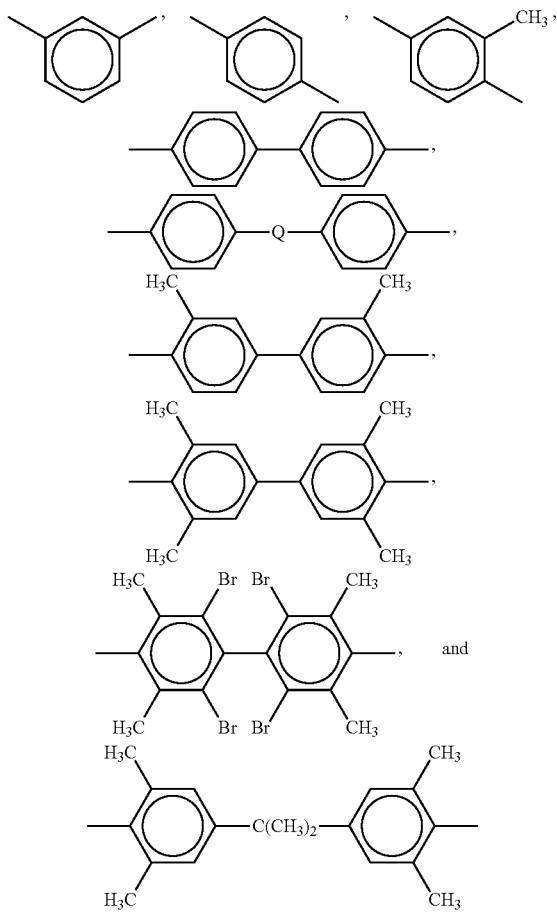

where Q is a divalent radical.

12. The polymer composition of claim 11, wherein R is phenyl and T is the following divalent radical:

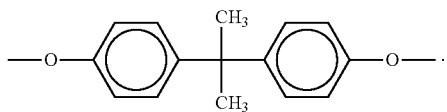

13. The polymer composition of claim 1, further comprising a thermotropic liquid crystalline polymer.

14. The polymer composition of claim 1, wherein aromatic amide oligomers are employed in an amount of from about 0.5 to about 50 parts by weight relative to 100 parts by weight of high performance polymers in the composition.

15. The polymer composition of claim 1, wherein high performance polymers constitute from about 70 wt. % to about 99.9 wt. % of the polymer composition.

16. The polymer composition of claim 1, wherein the ratio of the melt viscosity of the polymer composition to the melt viscosity of the high performance polymer is about 0.98 or less.

17. The polymer composition of claim 1, wherein the ratio of the glass transition temperature of the polymer composition to the glass transition temperature of the high performance polymer is about 0.98 or less.

18. A polymer composition comprising a polyetherimide and an aromatic amide oligomer having the following general formula (I):

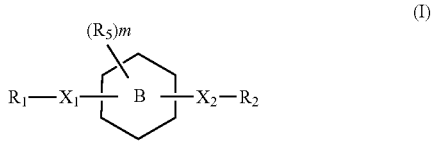

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl.

19. A polymer composition comprising a high performance polymer having a glass transition temperature of about 100° C. or more, a thermotropic liquid crystalline polymer, and an aromatic amide oligomer having the following general formula (I):

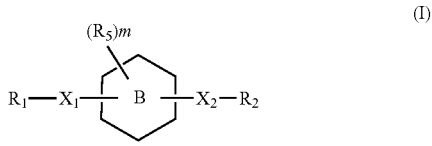

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

20. The polymer composition of claim 19, wherein the aromatic amide oligomer has a molecular weight of about 2,000 grams per mole or less.

21. The polymer composition of claim 19, wherein ring B is phenyl.

22. The polymer composition of claim 19, wherein the aromatic amide oligomer has the following general formula (II):

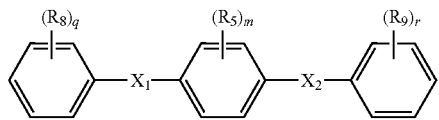

wherein, $X_1$ and $X_2$ are independently C(O)HN or NHC(O);

$R_5$, $R_8$, and $R_9$ are independently selected from halo, haloalkyl, alkyl, alkenyl, alkynyl, aryl, heteroaryl, cycloalkyl, and heterocyclyl;

m is from 0 to 4; and q and r are independently from 0 to 5.

23. The polymer composition of claim 22, wherein m, q, and r are 0.

24. The polymer composition of claim 19, wherein the oligomer is selected from the group consisting of the following compounds and combinations thereof:

| Structure | Name |
|---|---|
|  | N1,N4-diphenylterephthalamide |
|  | N1,N4-diphenylisophthalamide |
|  | N1,N4-bis(2,3,4,5,6-pentafluorophenyl)-terephthalamide |
|  | N1,N4-bis(4-benzamidophenyl)terephthalamide |

-continued

| Structure | Name |
|---|---|
| | N4-phenyl-N1-4-[[4-(phenylcarbamoyl)benzoyl]amino]phenyl] terephthalamide |
| | N4-phenyl-N1-[3-[[4-(phenylcarbamoyl)benzoyl]amino]phenyl] terephthalamide |
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |

-continued

| Structure | Name |
|---|---|
| | N1,N3-bis(3-benzamidolphenyl)benzene-1,3-dicarboxamide |
| | N1,N4-bis(4-pyridyl)terephthalamide |
| | N1,N3-bis(4-phenylphenyl)benzene-1,3-dicarboxamide |
| | N1,N3,N5-triphenylbenzene-1,3,5-tricarboxamide |
| | N-(4,6-dibenzamido-1,3,5-triazin-2-yl)benzamide |

| Structure | Name |
|---|---|
| | N2,N7-dicyclohexylnaphthalene-2,7-dicarboxamide |
| | N2,N6-dicyclohexylnaphthalene-2,6-dicarboxamide |
| | N1,N3-dicyclohexyl-1,3-Benzenedicarboxamide |
| | N1,N4-dicyclohexyl-1,4-Benzenedicarboxamide. |

25. The polymer composition of claim 19, wherein the aromatic amide oligomer is N1,N4-diphenylterephthalamide, N1,N3-diphenylisophthalamide, N1,N3-dicyclohexyl-1,3-benzenedicarboxamide, or N1,N4-dicyclohexyl-1,4-benzenedicarboxamide.

26. The polymer composition of claim 19, wherein the high performance polymer has a glass transition temperature of from about 130° C. to about 230° C.

27. The polymer composition of claim 19, wherein the high performance polymer is a polyaryletherketone.

28. The polymer composition of claim 27, wherein the polyaryletherketone has a melt viscosity of about 150 Pa-s or more, as determined in accordance with ISO Test No. 11443 at a shear rate of 1000 s$^{-1}$ and temperature of 370° C.

29. The polymer composition of claim 27, wherein the polyaryletherketone is polyetheretherketone, polyetherketone, polyetherketoneketone, polyetherketoneetherketoneketone, polyetheretherketoneketone, polyether-diphenyl-ether-ether-diphenyl-ether-phenyl-ketone-phenyl, or a blend or copolymer thereof.

30. The polymer composition of claim 19, wherein aromatic amide oligomers are employed in an amount of from about 0.5 to about 50 parts by weight relative to 100 parts by weight of high performance polymers in the composition.

31. The polymer composition of claim 19, wherein high performance polymers constitute from about 70 wt. % to about 99.9 wt. % of the polymer composition.

* * * * *